United States Patent
Fujimoto et al.

(10) Patent No.: US 7,167,281 B1
(45) Date of Patent: Jan. 23, 2007

(54) IMAGE PROCESSING APPARATUS AND METHOD FOR BINARIZING A MULTILEVEL IMAGE

(75) Inventors: Katsuhito Fujimoto, Kawasaki (JP); Atsuko Ohara, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1061 days.

(21) Appl. No.: 09/669,663

(22) Filed: Sep. 26, 2000

(30) Foreign Application Priority Data

Nov. 26, 1999 (JP) .................................. 11-335495

(51) Int. Cl.
H04N 1/38 (2006.01)
H04N 1/40 (2006.01)
H04N 1/00 (2006.01)
H04N 1/04 (2006.01)

(52) U.S. Cl. .................. 358/464; 358/465; 358/401; 358/406

(58) Field of Classification Search ................ 358/464, 358/465, 401, 406, 474
See application file for complete search history.

(56) References Cited

U.S. PATENT DOCUMENTS 4,903,316 A * 2/1990 Hongo et al. ............... 382/272
5,583,659 A * 12/1996 Lee et al. .................. 358/3.13
6,577,762 B1 * 6/2003 Seeger et al. ............... 382/173
6,603,880 B2 * 8/2003 Sakamoto ................... 382/173

FOREIGN PATENT DOCUMENTS

JP  A 61-026149  2/1986
JP  11-265453  9/1999

OTHER PUBLICATIONS

Otsu, N., "An Automatic Threshold Selection Method Based on Discriminant and Least Squares Criteria," IEICE Trans., vol. J63-D No. 4.
Trier, O.D., et al., "Goal-Directed Evaluation of Binarization Methods," IEEE Trans. on Pattern Anal. and Machine Intell., vol. 17, No. 12.
Korean Office Action mailed Jun. 29, 2006 in a corresponding Korean Patent Application.

* cited by examiner

*Primary Examiner*—Jerome Grant, II
*Assistant Examiner*—Houshang Safaipour
(74) *Attorney, Agent, or Firm*—Staas & Halsey LLP

(57) ABSTRACT

It is judged for each pixel in an inputted multilevel image whether the pixel is a background pixel, and the pixel is locally binarized if it is judged not to be a background pixel. Then, it is judged whether the pixel belongs to a background or a stroke, such as of a character, ruled line, etc., and a binary image is generated.

28 Claims, 30 Drawing Sheets

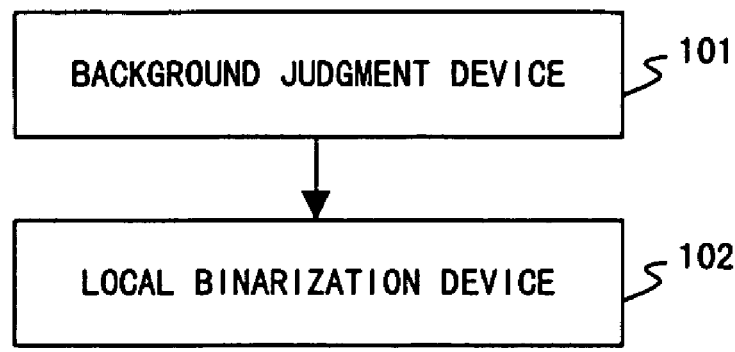
F I G. 2A
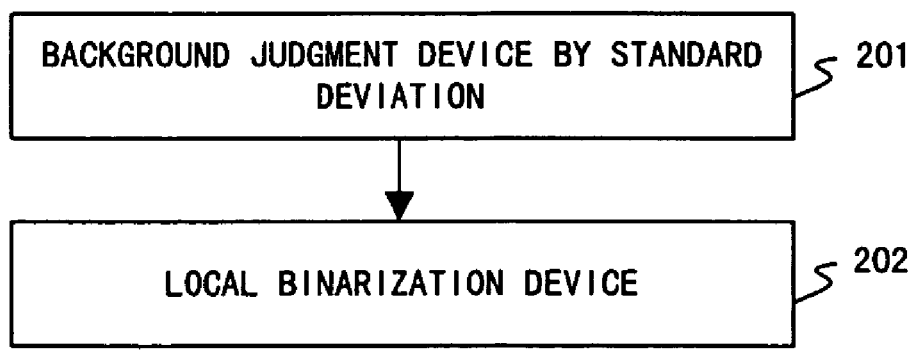
F I G. 2B

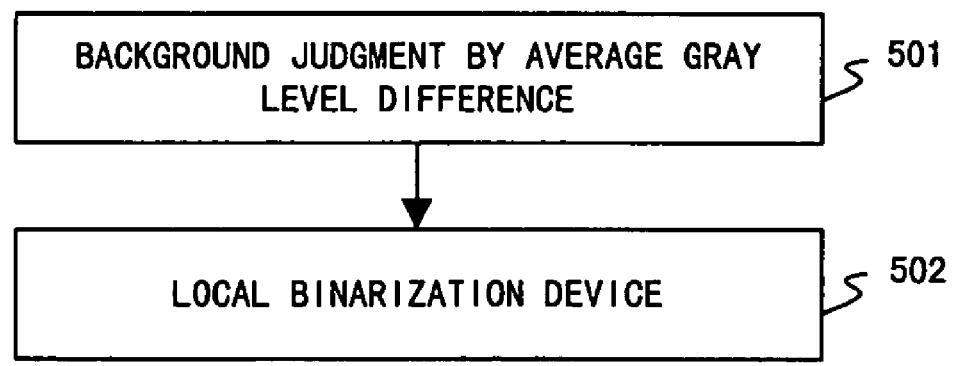
F I G. 5

IMAGE PROCESSING APPARATUS AND METHOD FOR BINARIZING A MULTILEVEL IMAGE

BACKGROUND OF THE INVENTION

1. Field of the Invention

The present invention relates to a multilevel image processing technology.

2. Description of the Related Art

Recently, a slip recognition technology using a non-contact type image input device, such as an over-head reader (OHR), has become a key for winning financial OCR (optical character reader) business.

An OHR is a stand type image input device provided with a line or area CCD (charge couple diode) as an image element, as shown in FIG. 1A. Compared with a conventional contact type image input device, such as an image scanner, etc., by using an OHR, entry to a slip can be made possible while a user is inputting an image and an image can be inputted while viewing a list of slips. Therefore, work can be performed comfortably.

Compared with an image obtained by a scanner (hereinafter called "a scanner image"), an image obtained by the OHR (hereinafter called "an OHR image") suffers from degradation, such as that caused by uneven gradation, reflection, image distortion, etc.

FIG. 1B shows an example of a scanner image, and FIG. 1C shows an example of an OHR image. The OHR image shown in FIG. 1C does not include the reflections of desks, walls, human beings, etc., and it is of fairly good quality for an OHR image. However, compared with the scanner image shown in FIG. 1B, the OHR image has a large degree of uneven gradation and character lines that are more blurred. If an OHR is used, there is also a case where an OHR image with reflections, as shown in FIG. 1D must be handled, since there is a possibility that the reflections of desks, walls, human beings, etc., may be included in an image. The OHR image shown in FIG. 1D is blurred from the right to the left of the image due to reflections and as if the image were gradated. If an OHR is used, the development of a base technology for overcoming such image degradation becomes a major problem.

In order to configure a high-precision binarizing system for an OHR image, it is necessary to obtain a character outline which is resistant against reflection and uneven gradation. Therefore, constant threshold value binarization is not sufficient and Niblack's local binarization (see Reference 1: IEEE Transactions on Pattern Analysis and Machine Intelligence, Vol. 17, No. 12, p. 1191–1202, 1995), etc., must be introduced.

Niblack's local binarization is a system of performing binarization for each pixel assuming that the threshold value of each pixel $T=E+K\sigma$ (E: average gray level of pixels in the vicinity of a target pixel, $\sigma$: standard deviation of gray level of the pixels in the vicinity of the target pixel, K: prescribed constant). A rectangular area of N×N (N is a constant) with the target pixel located at the center is used as the vicinity of the target pixel.

However, if a conventional system, such as Niblack's binarization, etc., is used without modification, a black-white flickering noise occurs since all pixels in the vicinity of the pixel have an even gray level inside a background or a thick line.

FIG. 1F shows a binary image obtained by performing Niblack's local binarization (N=7, K=−0.1) for the OHR image shown in FIG. 1E. According to the conventional binarization system, a black-white flickering noise occurs, as shown in FIG. 1F. Such a noise in which "black" and "white" are flickering must be eliminated.

Although a method of eliminating the black-white flickering noise which occurs in the case where Niblack's local binarization is applied is described in the previous reference, the method is complex, the process requires many steps and the calculation cost is high, which is a problem.

SUMMARY OF THE INVENTION

It is an object of the present invention to eliminate a black-white flickering noise, which is the problem of the conventional binarization system, at a cost that is as low as possible.

In order to solve the problem described above, a background judgment device judging whether each target pixel is a background pixel based on information obtained in the vicinity of the target pixel, is introduced in the present invention, and is used in combination with a local binarization, such as Niblack's, etc.

One aspect of the present invention comprises a background judgment device and a local binarization device. On receipt of a multilevel image, the background judgment device judges for each pixel whether the pixel is a background pixel. If it is judged that the pixel is not a background pixel, the local binarization device locally binarizes the pixel, judges whether the pixel belongs to a background or a stroke composing a character, ruled line, etc., and outputs a binary image.

Another aspect of the present invention comprises a background judgment device, a local binarization device and a line element restriction device. On receipt of a multilevel image, the background judgment device judges whether the pixel is a background pixel. If it is judged that the pixel is not a background pixel, the local binarization device locally binarizes the pixel, judges whether the pixel belongs to a background or a stroke composing a character, ruled line, etc., and outputs a binary image. If the ratio of the black pixels in a shape-fixed line element mask, including a target pixel of the obtained binary image is a prescribed value or more, the line element restriction device leaves the black pixels as black pixels or converts all pixels in the line element mask into black pixels.

Another aspect of the present invention comprises a background judgment device, a local binarization device, a line element restriction device and a stroke separation device. On receipt of a multilevel image, the background judgment device judges for each pixel whether the pixel is a background pixel. If it is judged that the pixel is not a background pixel, the local binarization device locally binarizes the pixel, judges whether the pixel belongs to a background or a stroke and outputs a binary image. If the ratio of the black pixels in the shape-fixed line element mask, including a target pixel of the obtained binary image is a prescribed value or more, the line element restriction device leaves the black pixels as black pixels or converts all pixels in the line element mask into black pixels. Then, the stroke separation device applies binarization to the partial pattern in the gray scale image, corresponding to the black pixel joint element of the obtained binary image, and divides the pattern into strokes of different gray levels.

Since in any of the configurations described above, the background judgment device roughly judges whether a target pixel is a background pixel prior to the local binarization, the occurrence of a black-white flickering noise can be suppressed at low calculation cost.

BRIEF DESCRIPTIONS OF THE DRAWINGS

FIG. 2A shows the configuration of an image processing apparatus in the first embodiment of the present invention.

FIG. 2B shows the configuration of the image processing apparatus in the second embodiment of the present invention.

FIG. 5 shows the configuration of the image processing apparatus in the third embodiment of the present invention.

FIG. 15 shows a binary image obtained by applying the process of the fifth embodiment of the present invention to the OHR image shown in FIG. 13.

FIG. 19 shows a binary image obtained by applying the process of the third embodiment of the present invention to the OHR image shown in FIG. 18.

FIG. 20 shows a binary image obtained by applying Niblack's local binarization to the OHR image shown in FIG. 18.

FIG. 21 shows a binary image obtained by applying the process of the sixth embodiment of the present invention to the OHR image shown in FIG. 18.

DESCRIPTION OF THE PREFERRED EMBODIMENTS

The embodiments of the present invention are described with reference to the drawings.

FIG. 2A shows the configuration of the image processing apparatus in the first embodiment of the present invention. This apparatus comprises a background judgment device 101 and a local binarization device 102. On receipt of a multilevel image, the background judgment device 101 judges for each pixel whether the pixcel is a background pixel. If it is judged that the pixel is not a background pixel, the local binarization device 102 locally binarizes the pixel, judges whether the pixcel belongs to a background or a stroke and outputs a binary image.

FIG. 2B shows the configuration of the image processing apparatus in the second embodiment of the present invention. This apparatus comprises a background device by standard deviation 201 and a local binarization device 202. On receipt of a multilevel image, the background judgment device by standard deviation 201 judges for each pixel whether the pixel is a background pixel. If it is judged that the pixel is not a background pixel, the local binarization device 102 locally binarizes the pixel, judges whether the pixel belongs to a background pixel or stroke and outputs a binary image.

Figure 3:
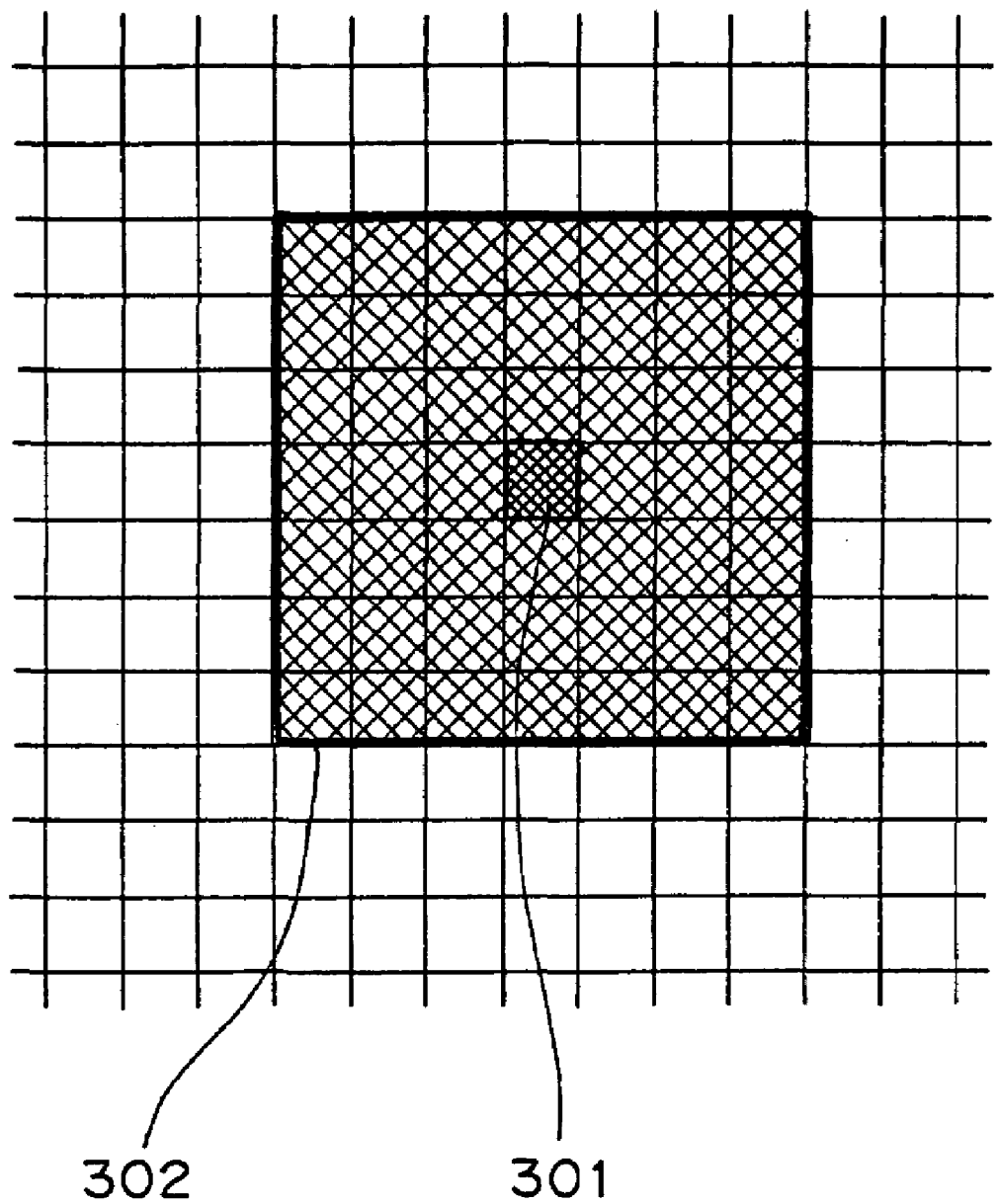
FIG. 3 shows an area in the vicinity of a target pixel.

The background judgment device by standard deviation 201 judges whether a target pixel is a background pixel, using the standard deviation a of the gray level of pixels in the vicinity area of the target pixel. Specifically, if σ<σ min (predetermined constant), it is considered that the gray level in the vicinity of the target pixel is even and it is judged that the pixel is a background pixel if this condition is met. The vicinity area of a target pixel is the vicinity of the pixel which is a joint area including the target pixel. An example of this is shown in FIG. 3. In FIG. 3, a rectangular area of N×N with a target pixel 301 located at the center (N=7 in FIG. 3) is the pixel vicinity area 302. The shape of the vicinity area is not limited to a rectangle and a circle, diamond, etc., are also available. It is permissible if the target 301 is not located at the center of the vicinity. The standard deviation of the gray level of the pixels in the vicinity area 302 is assigned as the standard deviation of the target pixel 301.

The local binarization device 202 performs Niblack's local binarization for only the pixels which the background judgment device 201 judges not to be a background pixel. Niblack's binarization is a binarization method using an amount which is calculated by T=E+Kσ using both the average of the gray level E and the standard deviation σ in the vicinity area of a target pixel.

Figure 1A:
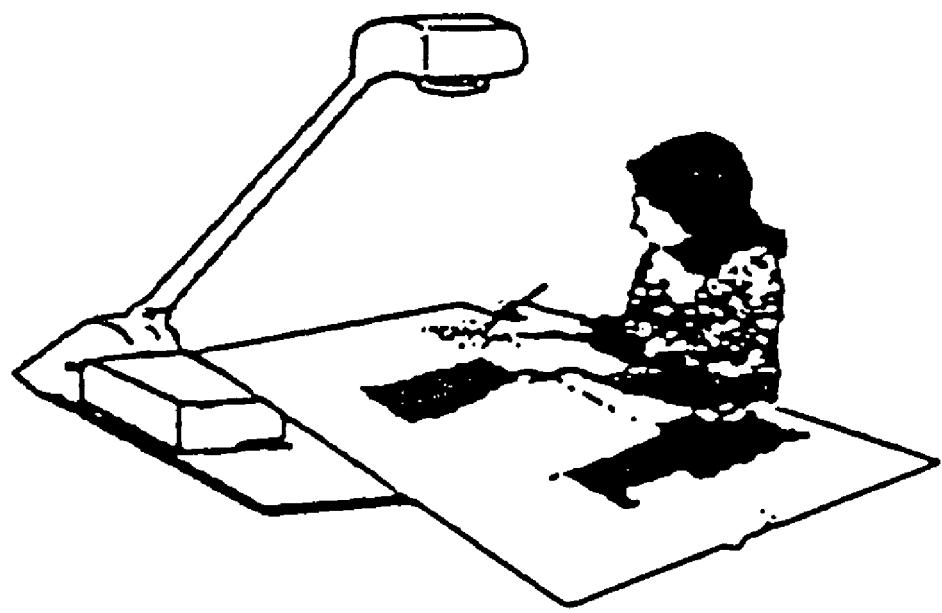
FIG. 1A shows the appearance of an over-head reader (OHR).
Figure 1B:
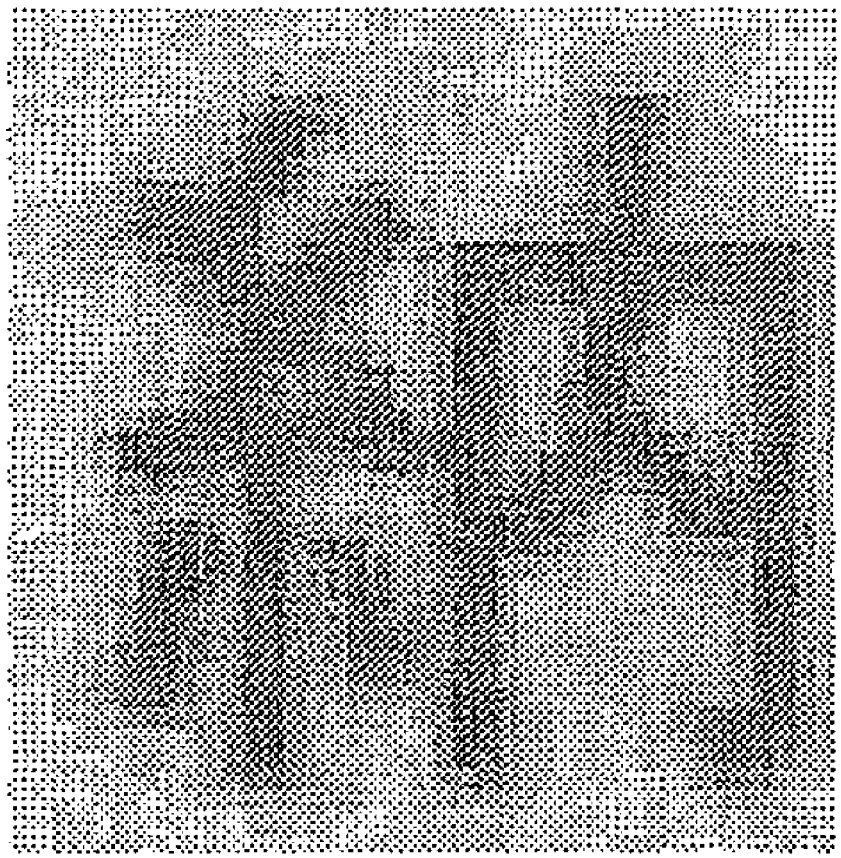
FIG. 1B shows an example of a scanner image.
Figure 1C:
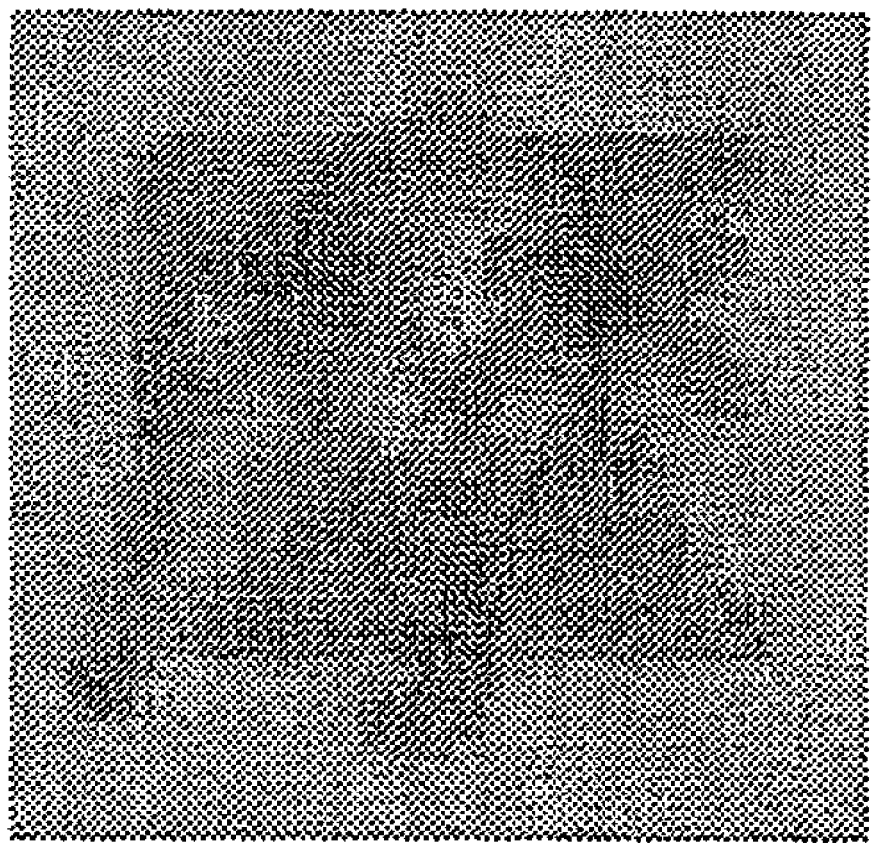
FIG. 1C shows an example of an OHR image without a shadow.
Figure 1D:
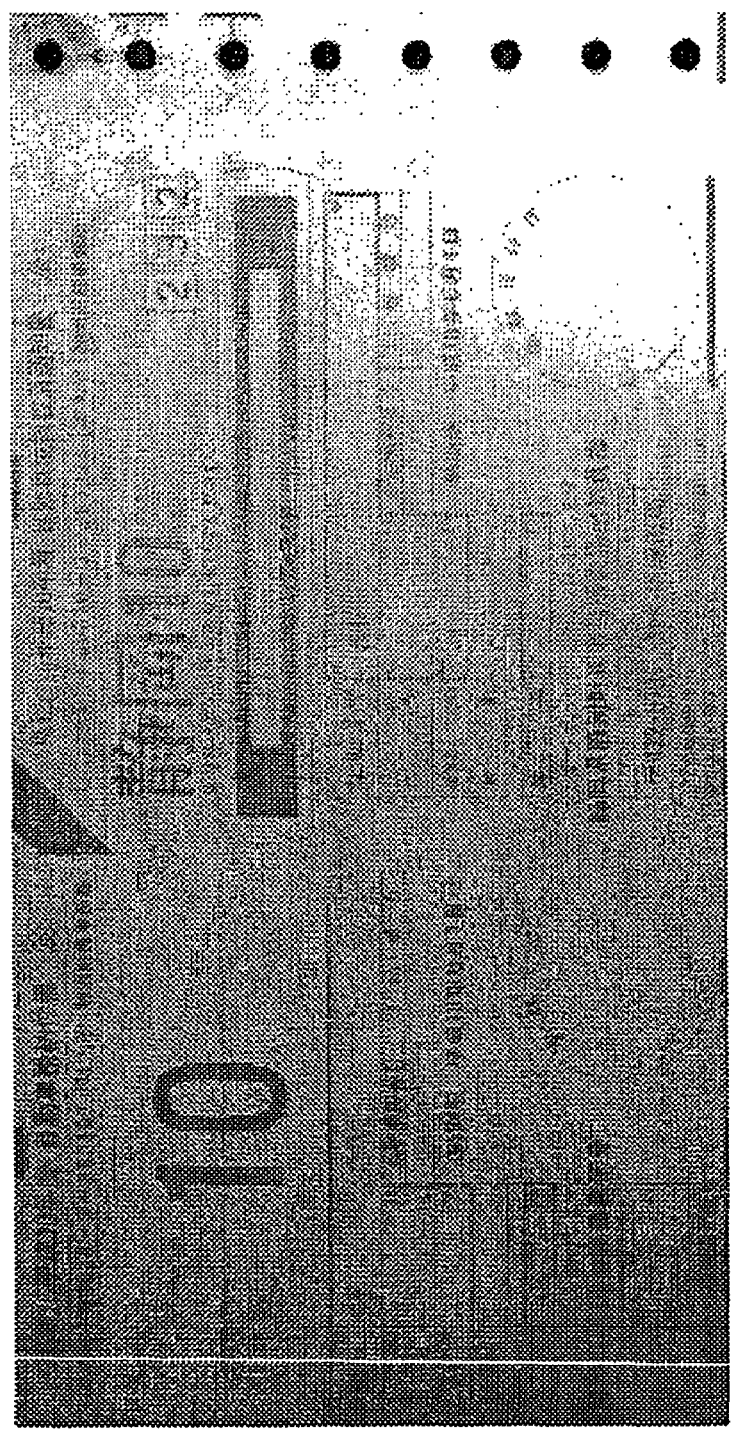
FIG. 1D shows an example of an OHR image with a shadow.
Figure 1E:
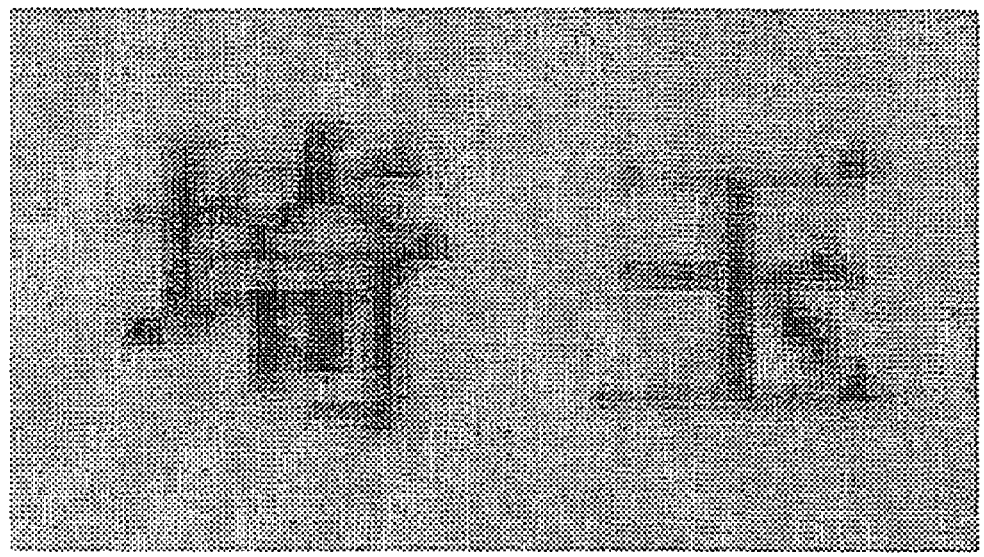
FIG. 1E shows an example of an OHR image.
Figure 1F:
FIG. 1F shows a binary image obtained by applying Niblack's local binarization to the OHR image shown in FIG. 1E.
Figure 4:
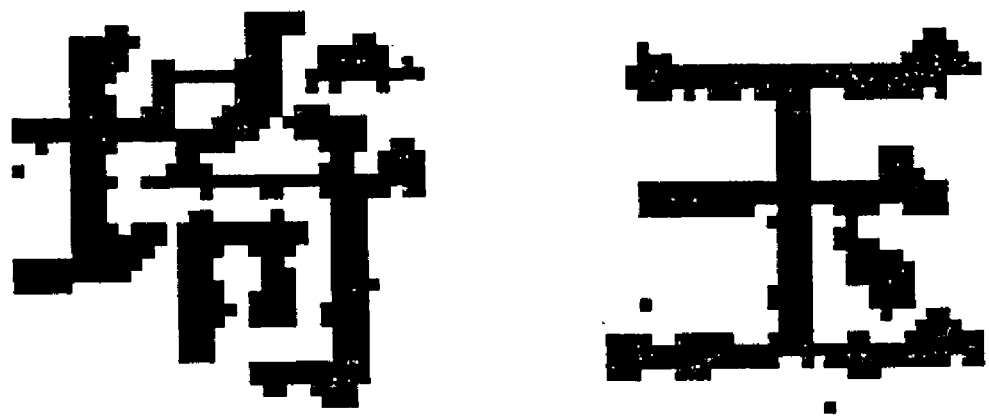
FIG. 4 shows a binary image obtained by applying the process of the second embodiment of the present invention to the OHR image shown in FIG. 1E.

FIG. 1F shows a result obtained by applying Niblack's local binarization to the OHR image shown in FIG. 1E, and FIG. 4 shows a result obtained by applying the process of the image processing apparatus in the second embodiment of the present invention to the image. If the results of FIG. 1F and FIG. 4 are compared, it is found from the process result of the second embodiment, in which Niblack's local binarization is performed after the background judgment by standard deviation, that most of the black-white flickering noises are eliminated. In the process of obtaining the result shown in FIG. 4, a rectangular area of 7×7 with a target pixel located at the center is used as a vicinity area, and it is assumed that σmin=10 and K=−0.1.

FIG. 5 shows the configuration of the image processing apparatus in the third embodiment of the present invention. This apparatus comprises a background judgment device by average gray level difference 501 and a local binarization device 502. On receipt of a multilevel image, the background judgment device by average gray level difference 501 judges for each pixel whether the pixel is a background pixel. If it is judged that the pixel is not a background pixel, the local binarization device 502 locally binarizes the pixel, judges whether the pixel belongs to a background or a stroke and outputs a binary image.

The background judgment device by average gray level difference 501 judges whether a target pixel is a background pixel, using an average gray level difference $\Delta g$ in the vicinity area of the target pixel.

Average gray level difference $\Delta g$ is an amount that is defined by the following equation.

$\Delta g$=Average gray level of white pixels in the vicinity area–Average gray level of black pixels in the vicinity area.

The average gray level of white pixels in the vicinity area and the average gray level of black pixels in the vicinity area are temporarily determined by a temporary binarization threshold value T'.

Figure 6:
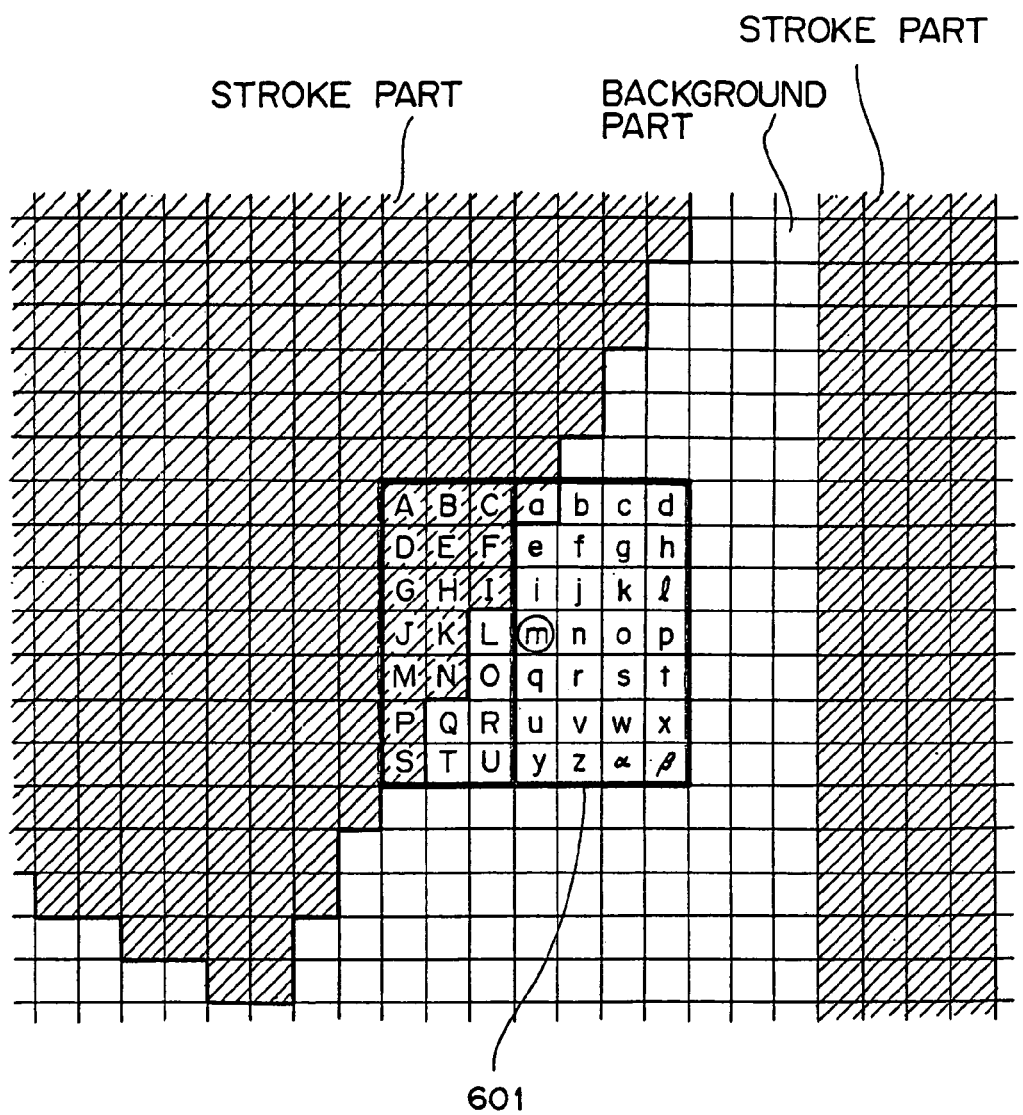
FIG. 6 shows an average gray level difference.

Average gray level difference $\Delta g$ is described with reference to FIG. 6. First, in the vicinity 601 of a target pixel m, pixels a through β and pixels A through U are temporarily determined to be white pixels and black pixels, respectively, by threshold T'. Then, the average gray level G1 of white pixels a through β and the average gray level G2 of black pixels A through U are calculated, and average gray level difference $\Delta g$ is calculated from the difference (G1–G2). The calculated $\Delta g$ is assigned as the average gray level difference $\Delta g$ of the target pixel m.

If there are both a background area and a stroke area in the vicinity area, the average gray level difference $\Delta g$ becomes great and if there is either a background area or a stroke area, the average gray level difference becomes small. Therefore, if in the background judgment device by average gray level difference 501, average gray level difference $\Delta g < \Delta g \text{min}$ (predetermined constant), it is judged that a target pixel is a background pixel. Then, the local binarization 502 applies Niblack's local binarization only to pixels which the background judgement device by average gray level difference 501 judges not to be background pixels.

Figure 7:
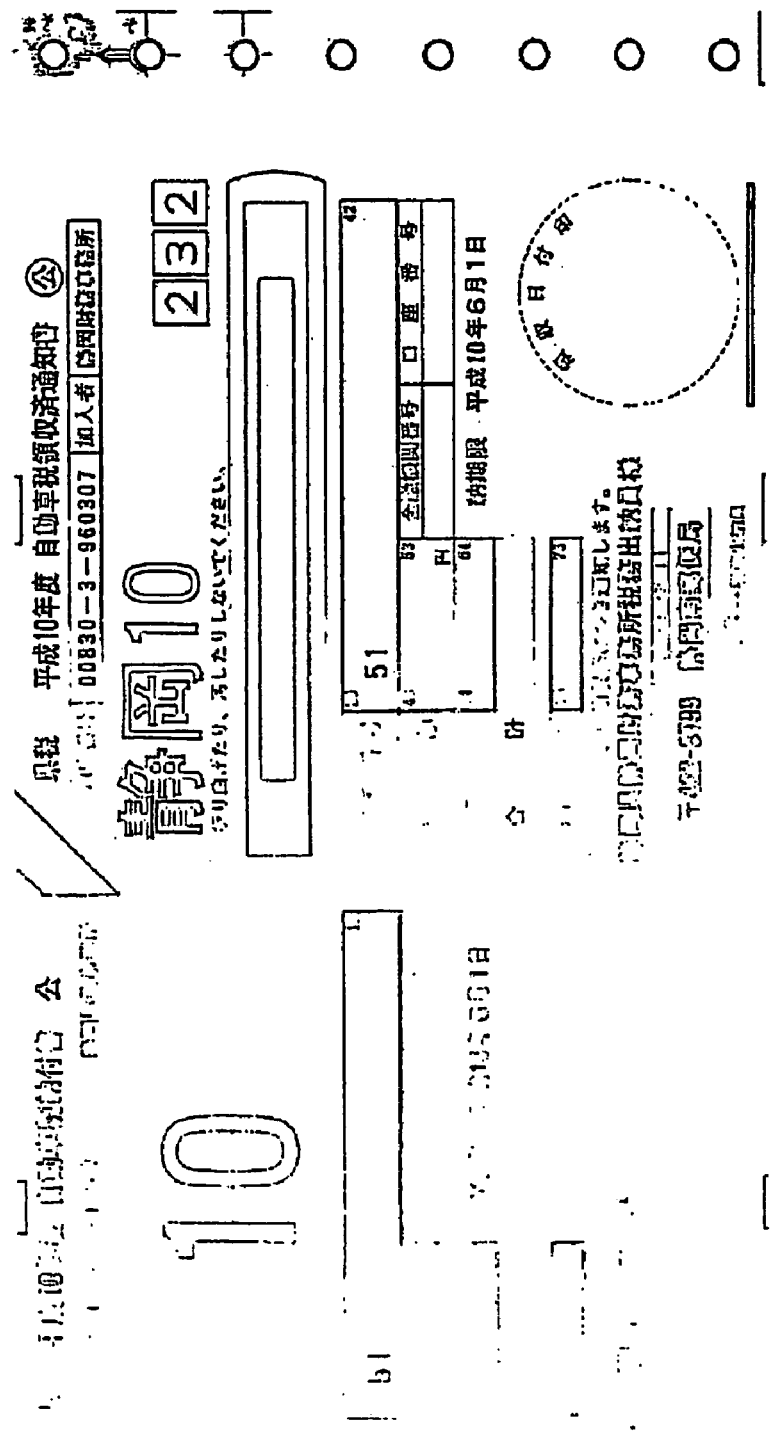
FIG. 7 shows a binary image obtained by applying the process of the second embodiment of the present invention to the OHR image shown in FIG. 1D.
Figure 8:
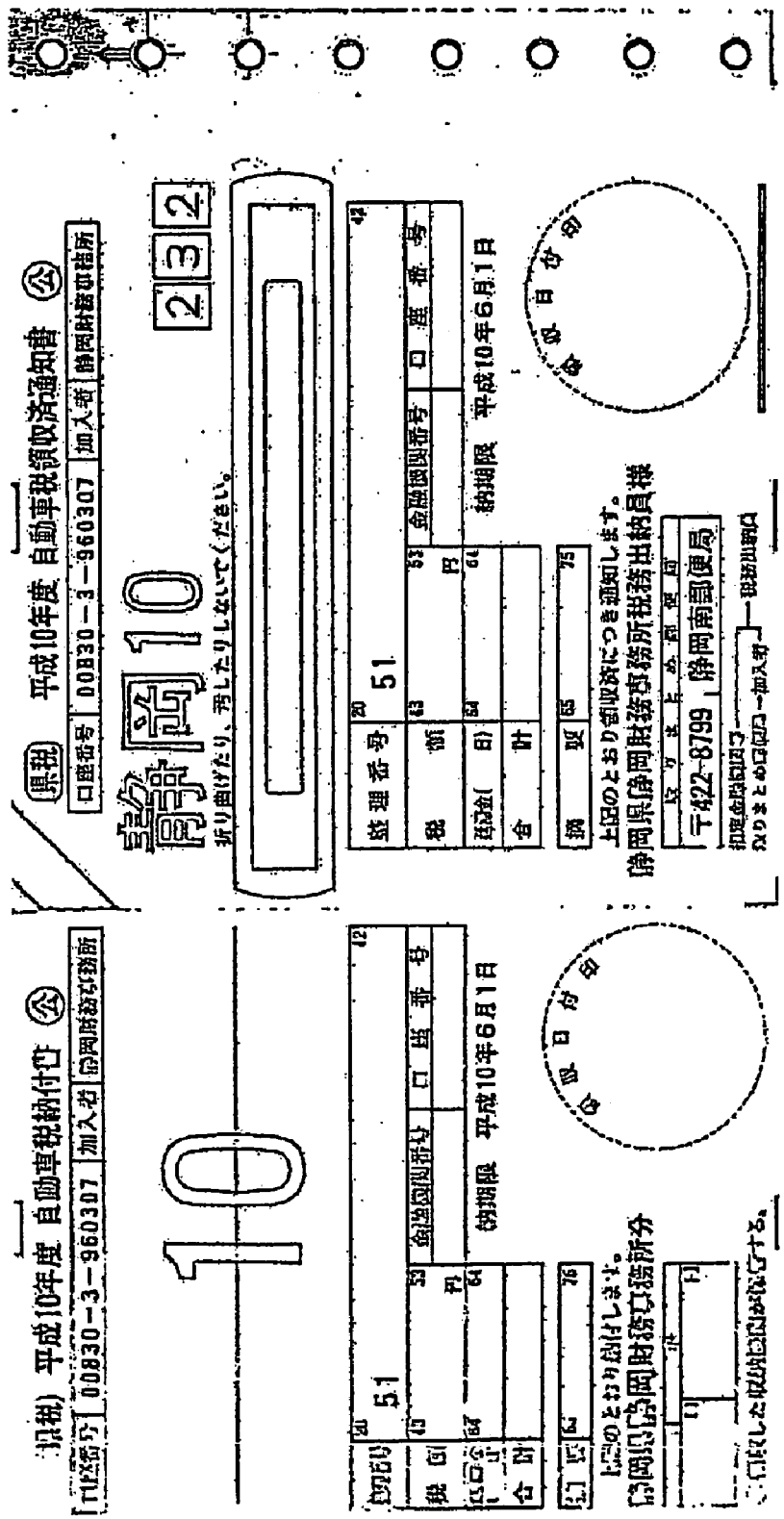
FIG. 8 shows a binary image obtained by applying the process of the third embodiment of the present invention to the OHR image shown in FIG. 1D.

FIG. 7 shows a result obtained by applying the process of the image processing apparatus in the second embodiment of the present invention, which comprises a background judgment device by standard deviation, to the OHR image shown in FIG. 1D, and FIG. 8 shows a result obtained by applying the process of the image processing apparatus in the third embodiment of the present invention, which comprises a background judgment device by average gray level difference, to the OHR image shown in FIG. 1D. In the processes of obtaining the results shown in FIGS. 7 and 8, a rectangular area of 7×7 with a target pixel located at the center is used as the vicinity area and it is assumed that $\sigma \text{min}=10$, $K=-0.1$ and $\Delta g \text{min}=8$.

Since FIG. 1D shows an OHR image with a shadow, there is a possibility that a background may also be judged as a black pixel in a shadowed part, and the gray level difference between a stroke and a background becomes small. Therefore, as shown in FIG. 7, strokes cannot be sufficiently extracted and are blurred in the image processing apparatus, which comprises a background judgment device by standard deviation, while as shown in FIG. 8, strokes can be extracted without blur and a good binarization result with little noise can be obtained in the image processing apparatus, which comprises a background judgment device by average gray level difference.

Although the background judgment device by average gray level difference 501 in the third embodiment of the present invention judges that a target pixel is a background pixel if average gray level difference $\Delta g < \Delta g \text{min}$ (predetermined constant), the average gray level difference also becomes small if there are only stroke areas in the vicinity area. Therefore, a pixel which should naturally be recognized to be a stroke is sometimes judged as being a background pixel. For example, although the characters of "静岡 1 0" shown in FIG. 1D, which is an original image, are black, the characters of "静岡 1 0" shown in FIG. 8, which is the process result in the third embodiment of the present invention, are white-punched. In order to prevent this, a process of further judgment about whether the target is a black or white pixel, based on the gray level of the target pixel is added after the judgment by the background judgment device by average gray level difference 501 in the third embodiment of the present invention about whether the target pixel is a background pixel as described earlier. In this way, strokes can be prevented from being white-punched.

Figure 9:
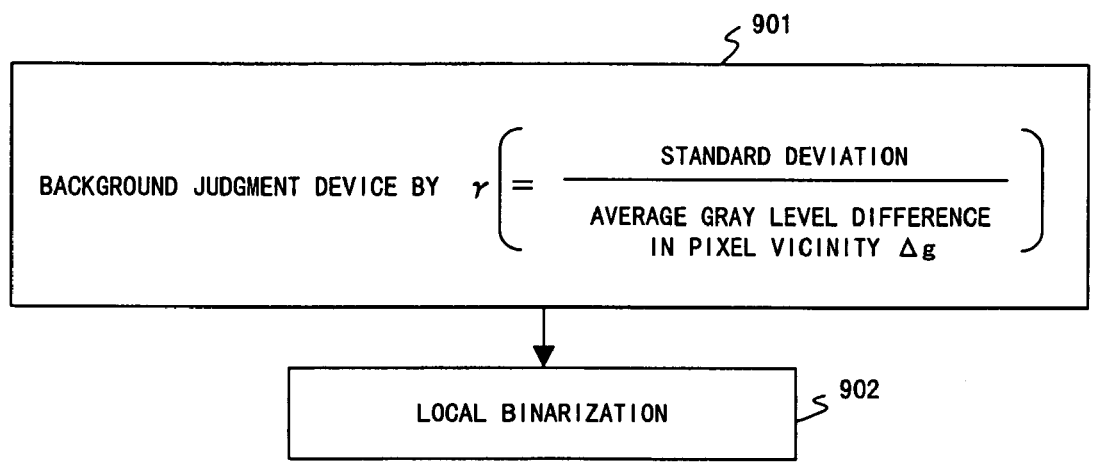
FIG. 9 shows the configuration of the image processing apparatus in the fourth embodiment of the present invention.

FIG. 9 shows the configuration of the image processing apparatus in the fourth embodiment of the present invention. This apparatus comprises a background judgment device by "r" 901 and a local binarization device 902. On receipt of a multilevel image, the background judgment device by "r" 901 judges for each pixel whether the pixel is a background pixel, and if the pixel is not a background pixel, the local binarization device 902 locally binarizes the pixel, judges whether the pixel belongs to a background or a stroke and outputs a binary image.

If it is assumed that the standard deviation of the gray level of pixels in the vicinity of a target pixel and the gray level difference in the even area of the target pixel are $\sigma$ and $\Delta g$, respectively, "r" in the background judgment device by "r" 901 is calculated by the following equation.

$r = \sigma / \Delta g$

The background judgment device by "r" 901 judges whether the target pixel is a background pixel, using the calculated "r".

Figure 10:
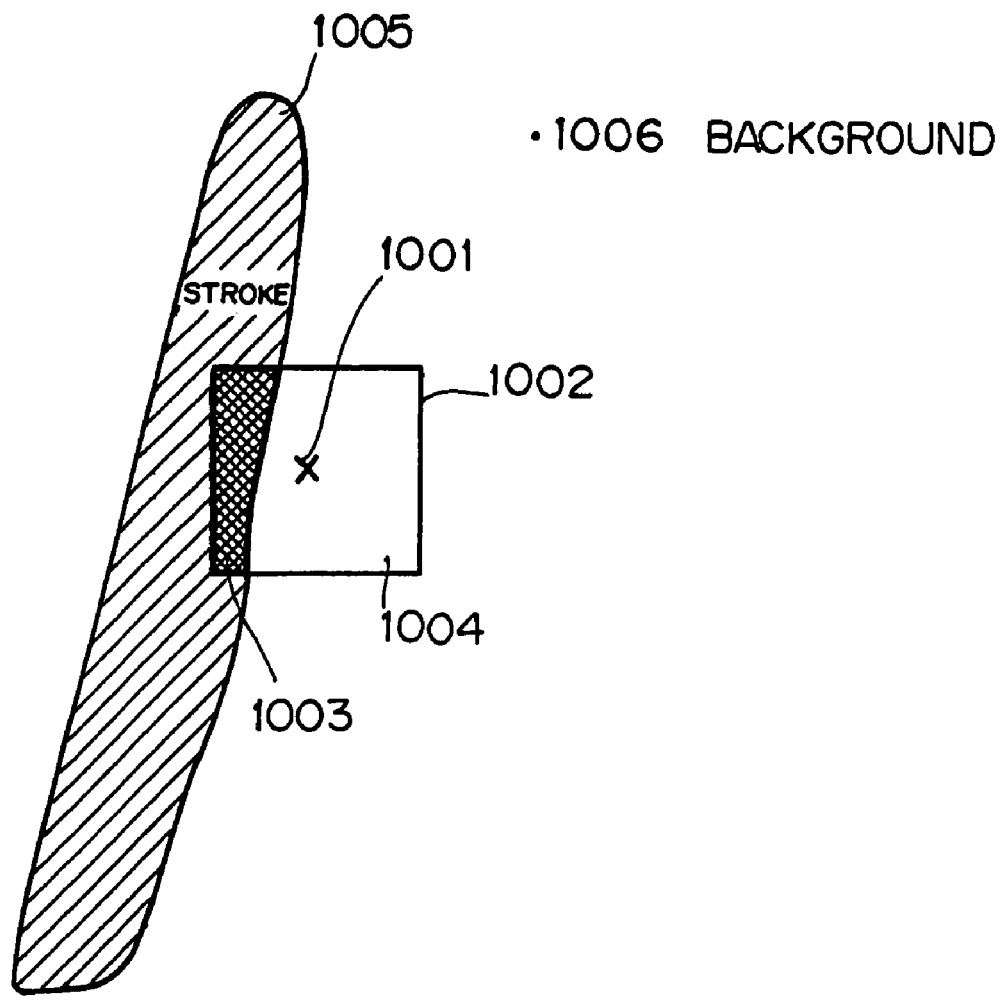
FIG. 10 shows "r", which is used in the fourth embodiment of the present invention.
Figure 11:
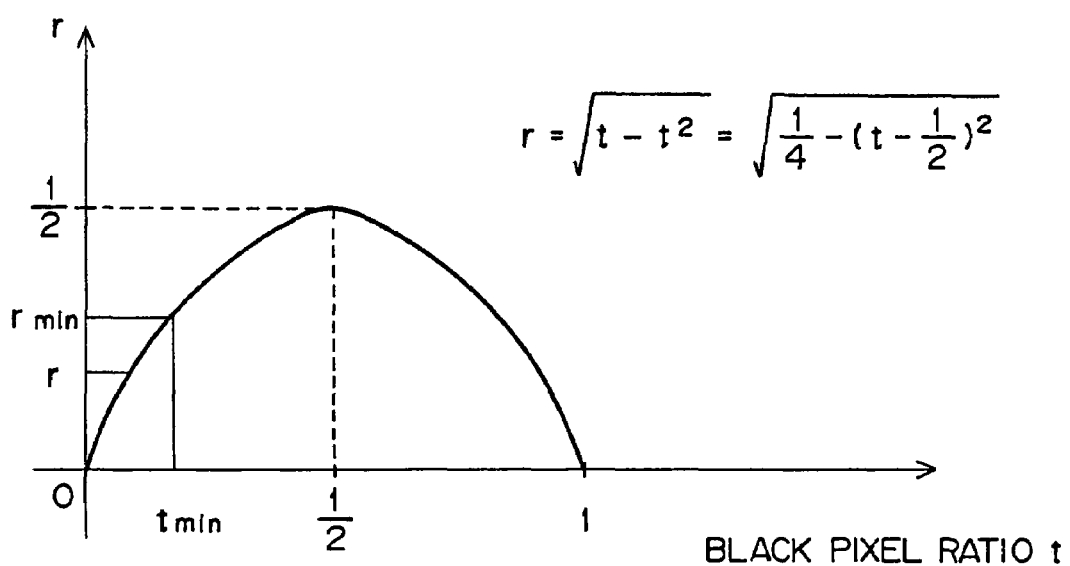
FIG. 11 shows the relationship between "r", which is used in the fourth embodiment of the present invention, and a black pixel ratio t.

Here, "r" is described with reference to FIGS. 10 and 11. FIG. 10 is an example of a specific multilevel image and shows a target pixel 1001, a vicinity area 1002, a black area in the vicinity area 1003, a white area in the vicinity area 1004, a stroke 1005 and a background 1006.

It is assumed that the average gray level of the black area in the vicinity 1003 and the average gray level of the white area in the vicinity area 1004 are g1 and g2, respectively. Then, the following equation holds true.

Standard deviation $\sigma = r \times |g1-g2| = r \Delta g$

Specifically, $r=\sigma/\Delta g$. If the black pixel ratio t in the vicinity area is assigned "r" is represented by the following equation (1), and the "r" and black pixel ratio t have the relationship shown in FIG. 11.

$$r = f(t) \qquad (1)$$
$$= (t(1-t))^{1/2}$$
$$= (t - t^2)^{1/2}$$
$$= (1/4 - (t - 1/2)^2)^{1/2}$$

Therefore, if "r" is small, the black pixel ratio t can be small. If the black pixel ratio t is small, specifically, a black area is narrow or there is very little black area, and the target pixel can be judged to be a background pixel. Therefore, if r<rmin (predetermined constant) is satisfied, the target pixel is judged to be a background pixel. Since r is a quadratic function, r and t are not determined one-to-one. Accordingly, there is a possibility that even if r<rmin is satisfied, the target pixel is not a background pixel. However, this can be handled by the background judgment device by average gray level difference in the third embodiment of the present invention executing the same process as that executed to prevent strokes from being white-punched.

The local binarization device 902 applies Niblack's local binarization to only pixels which the background judgment device of "r" 901 judges not to be a background pixel.

Figure 12:
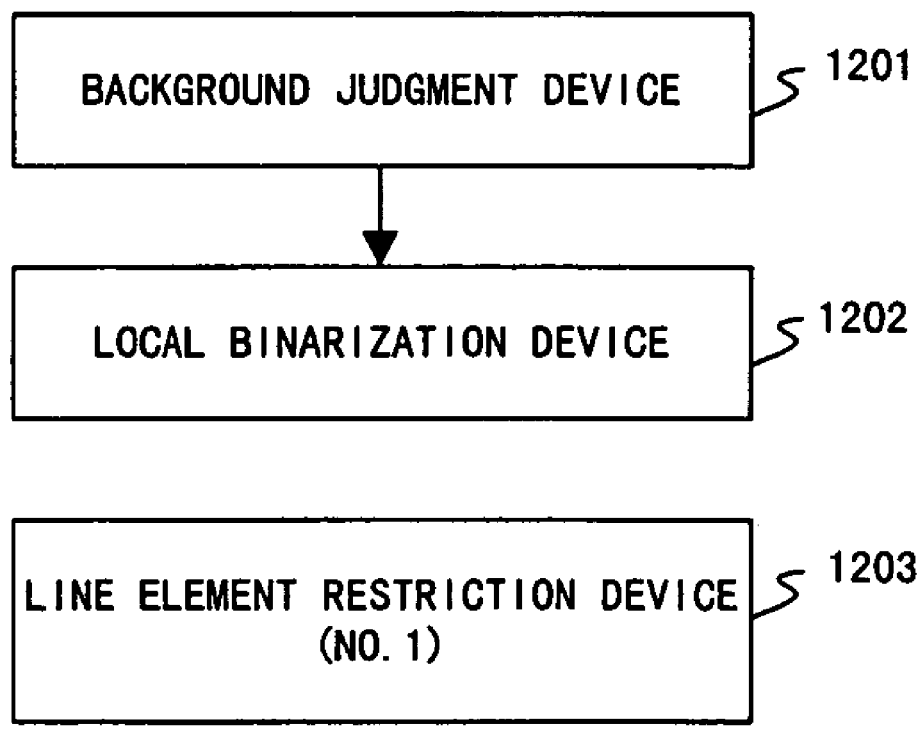
FIG. 12 shows the configuration of the image processing apparatus in the fifth embodiment of the present invention.

FIG. 12 shows the configuration of the image processing apparatus in the fifth embodiment of the present invention. This apparatus comprises a background judgment device 1201, a local binarization device 1202 and a line element restriction device (No. 1) 1203. The feature of this embodiment is that the line element restriction device (No. 1) 1203 eliminates noises which cannot be formed into a line element since a stroke is composed of line elements, which is formed by joining pixels, and the accuracy of background judgment can be improved.

In the image processing apparatus shown in FIG. 12, on receipt of a multilevel image, the background judgment device 1201 judges for each pixel whether the pixel is a background pixel, and if the pixel is not a background pixel, the local binarization device 1202 locally binarizes the pixel, judges whether the pixel belongs to a background or a stroke and outputs a binary image. If all pixels in a shape-fixed line element mask including the target pixel in the obtained binary image are black, the line element restriction device 1203 leaves all the pixels in the line element mask as black, and if they are not so, it modifies all the pixels in the line element mask to white pixels.

Here it is assumed that the line element mask used in the line element restriction device (No. 1) 1203 is a rectangular mask with a horizontal/vertical ratio of 1×3 or 3×1. Since generally a stroke is composed of three dots or more, a mask of 1×3 or 3×1 can be used and noises which do not amount to the thickness of a stroke can be eliminated. In this way, a stroke on a checkered pattern where one dot of a black pixel and one dot of a white pixel are alternately arrayed can be extracted. The checkered pattern where one dot of a black pixel and one dot of a white pixel are alternately arrayed is recognized as a gray-painted area by human eyes and this is a technology which an image processing apparatus which receives slips as input images requires.

Figure 13:
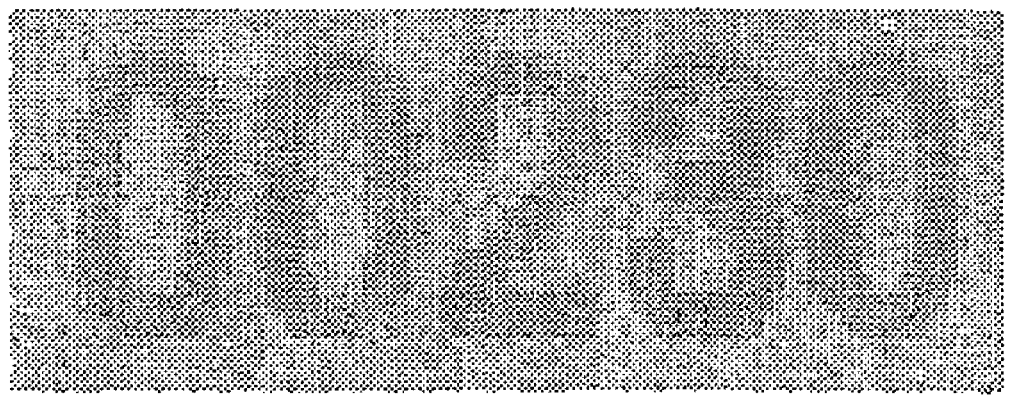
FIG. 13 shows another OHR image.
Figure 14:
FIG. 14 shows a binary image obtained by locally binarizing the OHR image shown in FIG. 13.
Figure 15:
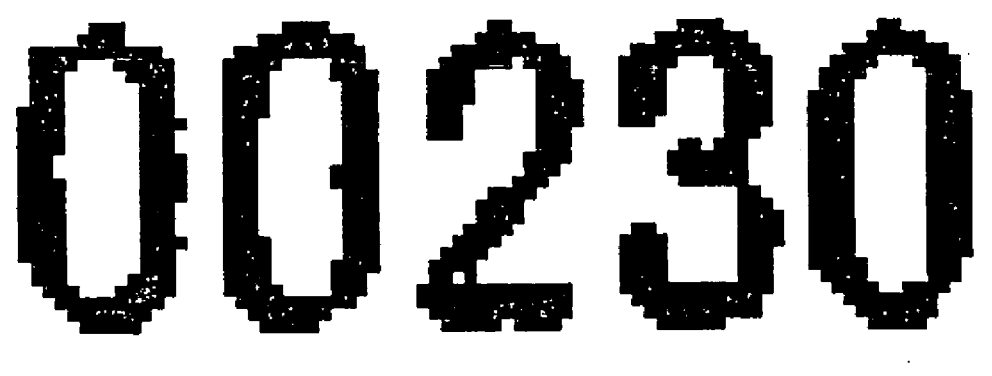

FIG. 13 shows the OHR image of a character "00230" in a slip, which is written on a checkered pattern which is recognized as a gray-painted area. FIG. 14 shows a result obtained by applying a local binarization to the OHR image shown in FIG. 13, and FIG. 15 shows a result obtained by applying the process of the image processing apparatus in the fifth embodiment of the present invention to the OHR image shown in FIG. 13. In FIG. 14, there are black-white flickering noises in a background area, while in FIG. 15 there are very little black-white flickering noise and clear strokes are extracted.

Figure 16:
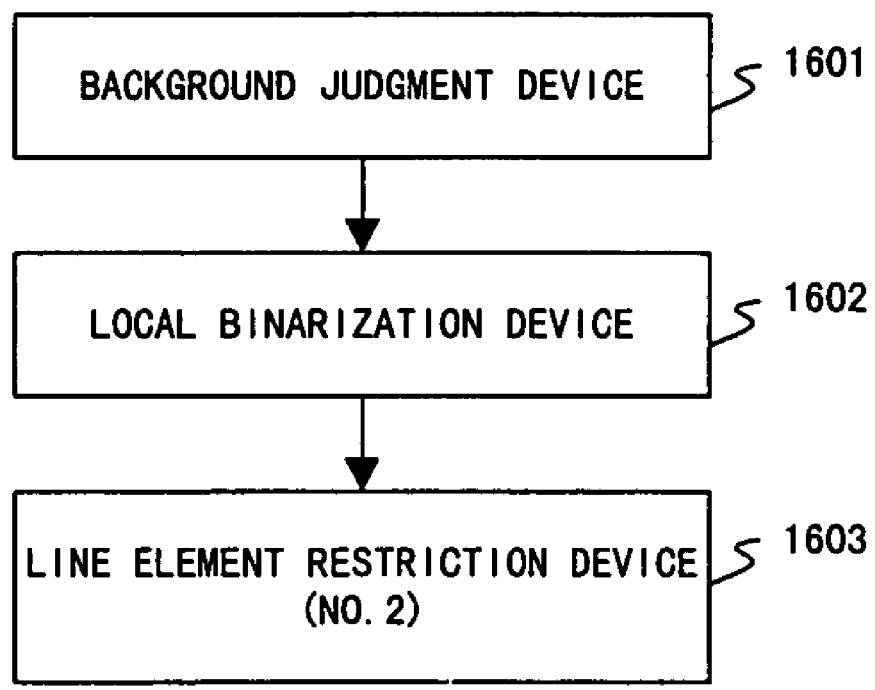
FIG. 16 shows the configuration of the image processing apparatus in the sixth embodiment of the present invention.

FIG. 16 shows the configuration of the image processing apparatus in the sixth embodiment of the present invention. This apparatus comprises a background judgment device 1601, a local binarization device 1602 and a line element restriction device (No. 2) 1603. Although the configuration of this embodiment (FIG. 16) is almost the same as that of the fifth embodiment (FIG. 12), they differ in the detailed processes of the line element restriction devices.

In the image processing apparatus shown in FIG. 16, on receipt of a multilevel image, the background judgment device 1601 judges for each pixel whether the pixel is a background pixel. If it is judged that the pixel is not a background pixel, the local binarization device 1602 locally binarizes the pixel, judges whether the pixel belongs to a background or a stroke and outputs a binary image. If the ratio of the black pixels in the shape-fixed line element mask including the target pixel in the obtained binary image is a prescribed value or more, the black pixels are left as black pixels or all pixels in the line element mask are converted into black pixels. If the ratio of the black pixels in the line element mask is less than the prescribed value, all pixels in the line element mask are converted into white pixels.

Figure 17:
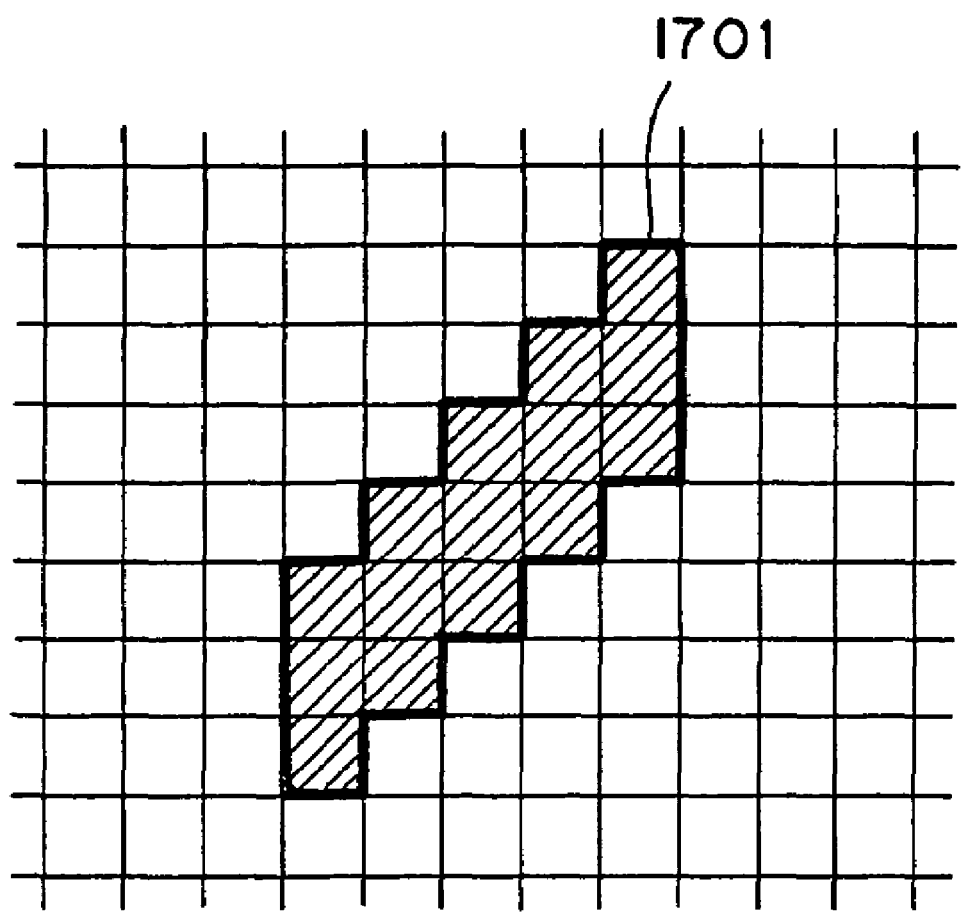
FIG. 17 shows an example of a slant mask.

For the line element masks used in the line element restriction device (No. 2) 1603, there are a total of six kinds of masks: four kinds of rectangular masks with horizonal/vertical ratios of 13×1, 1×13, 5×3 and 3×5, with a target pixel located at the center, and two kinds of slant masks of 5×3 and 3×5. FIG. 17 shows a slant mask of 5×3 1701. The line element restriction device (No. 2) 1603 converts all pixels in the line element mask if 11 pixels are black pixels in the line element mask, and, otherwise, it converts all pixels in the line element mask into white pixels. In this way, good strokes can even be extracted from blurred strokes.

Although the image processing apparatus is configured in such a way that the background judgment device 1601 judges, the local binarization device 1602 performs a local binarization and the line element restriction device 1603 eliminates black-white flickering noises from the obtained binary image, it can also be configured in such a way that the local binarization device 1602 performs a local binarization without the background judgment by the background judgment device 1601 and the line element restriction device 1603 eliminates the black-white flickering noises from the obtained binary image.

Figure 18:
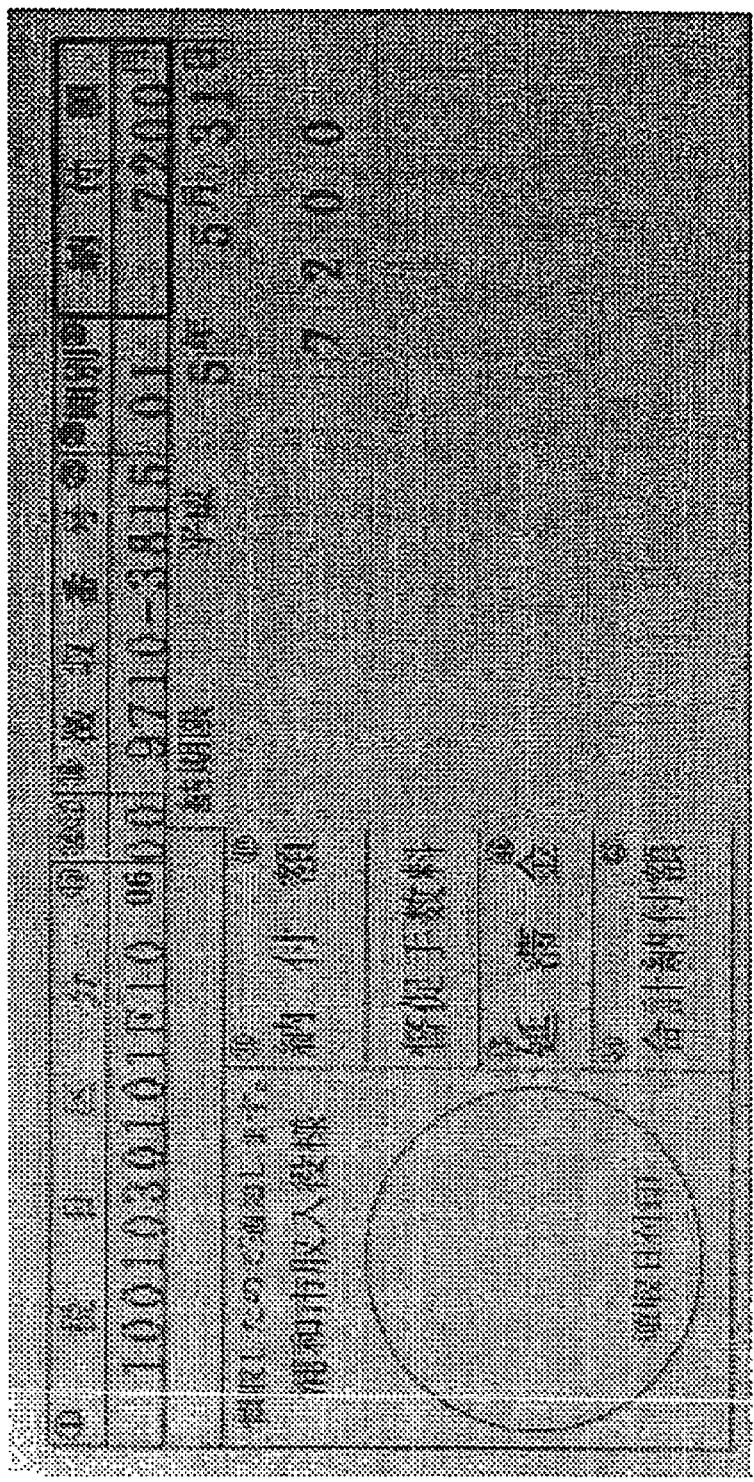
FIG. 18 shows another OHR image.
Figure 19:
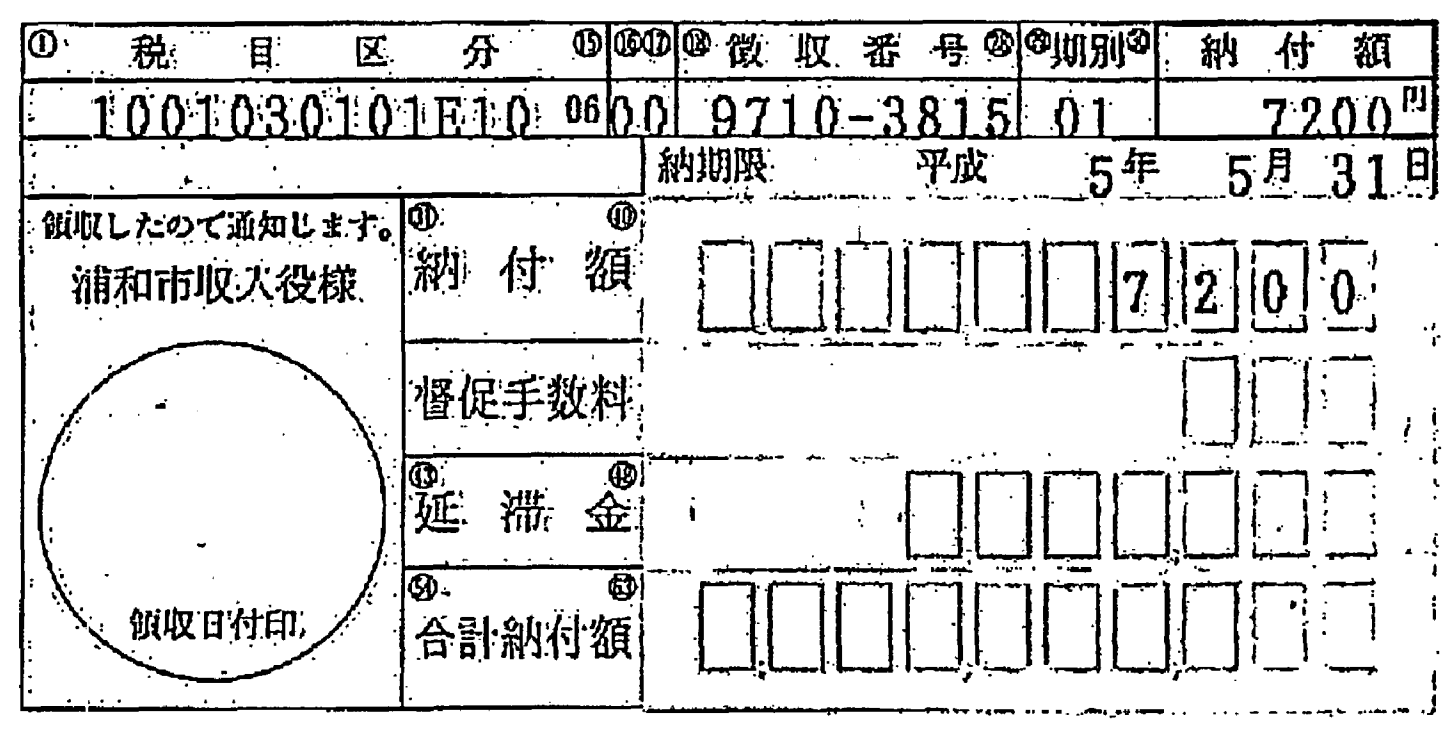
Figure 20:
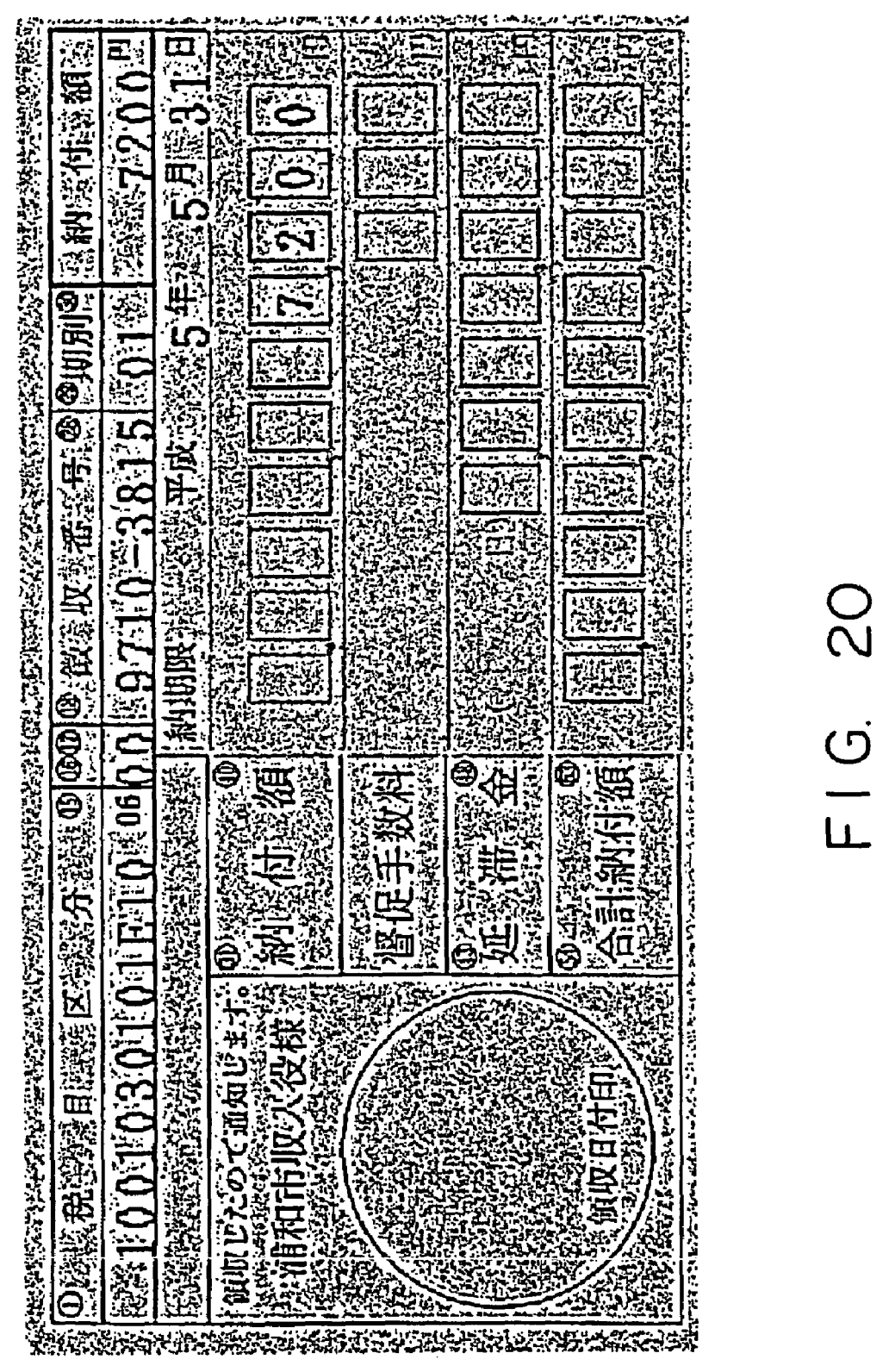
Figure 21:
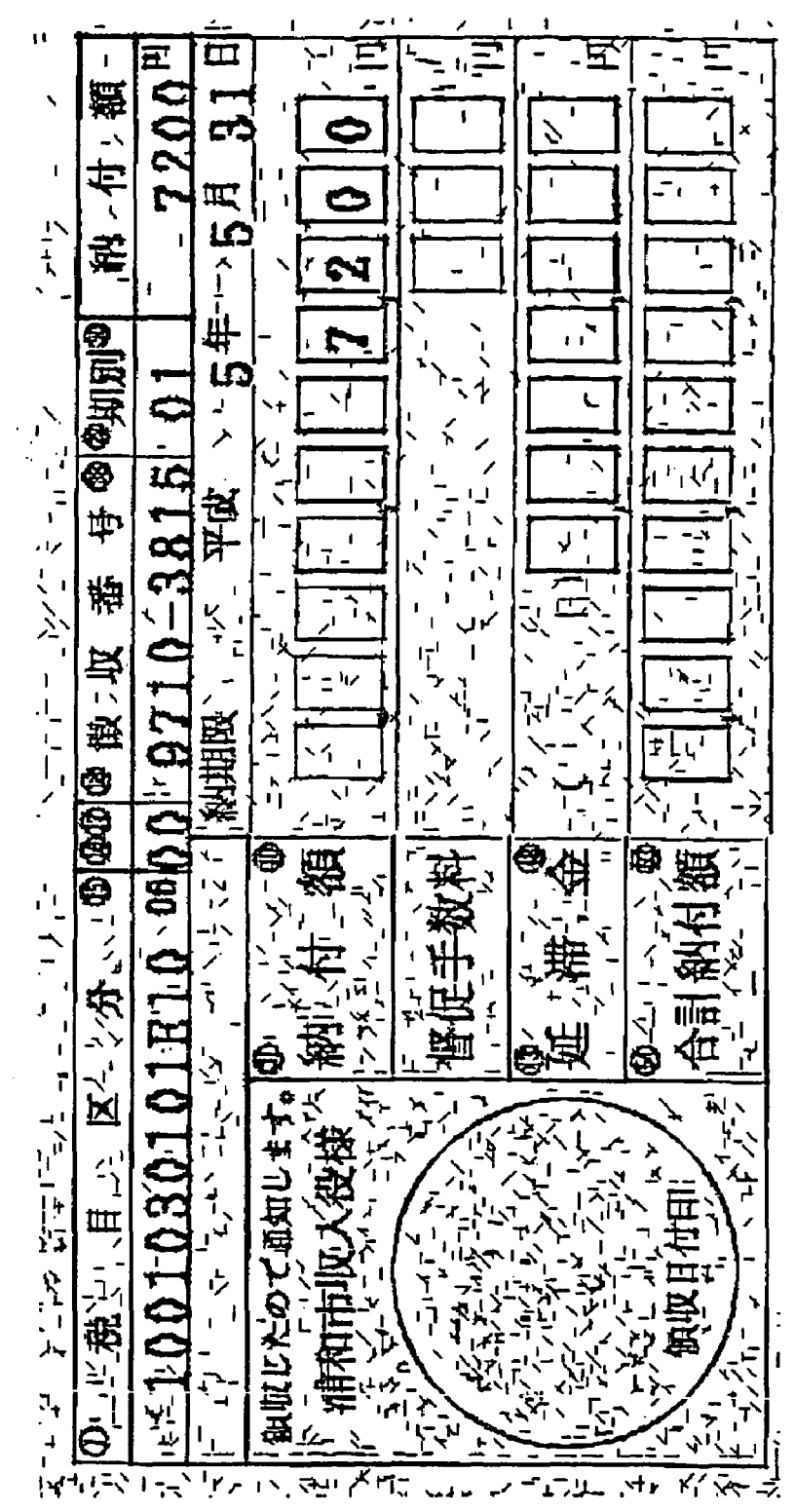

FIG. 18 shows an example of an OHR image with a shadow. The ruled lines in the lower right section of FIG. 18 are blurred. FIG. 19 shows a binary image obtained by applying the process of the third embodiment of the present invention, in which background judgment by average gray level difference is made and a local binarization is performed, to the image shown in FIG. 18. In this case, strokes composing the ruled lines in the lower right section are blurred. FIG. 20 shows a binary image obtained by applying Niblack's local binarization to the image shown in FIG. 18 without any background judgment. In this case, although there are black-white flickering noises in the background area of FIG. 20, it must be noted that strokes composing the ruled lines are clearly extracted. Furthermore, FIG. 21 shows a binary image obtained by applying the process of the sixth embodiment of the present invention to the image shown in FIG. 18. Although FIG. 21 includes noises, strokes composing the ruled lines are clearly extracted. There is a possibility that good ruled lines may be extracted by eliminating lines short of a prescribed length based on the length restriction of ruled lines, etc., in a subsequent stage.

Figure 22:
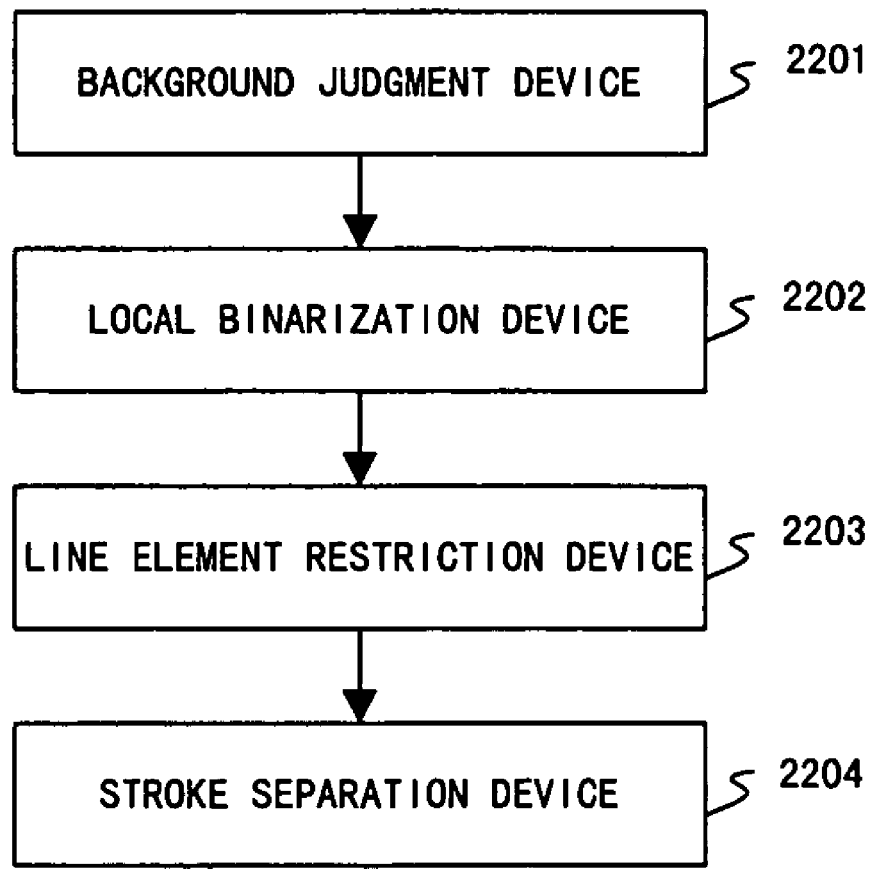
FIG. 22 shows the configuration of the image processing apparatus in the seventh embodiment of the present invention.

FIG. 22 shows the configuration of the image processing apparatus in the seventh embodiment of the present invention. This apparatus comprises a background judgment device 2201, a local binarization device 2202, a line element restriction device 2203 and a stroke separation device 2204. The feature of this embodiment is that the stroke separation device 2204 separates two strokes of different gray levels if they touch. According to this embodiment, characters can be accurately extracted from a gray scale image in which a ruled line and a character touch.

On receipt of a multilevel image, the background judgment device 2201 judges for each pixel whether the pixel is a background pixel. If it is judged that the pixel is not a background pixel, the local binarization device 2202 locally binarizes the pixel, judges whether the pixel belongs to a background or a stroke and outputs an binary image. If the ratio of the black pixels in the shape-fixed line element mask including a target pixel of the obtained binary image is a prescribed value or more, the line element restriction device 2203 leaves the black pixels as black pixels or converts all pixels in the line element mask into black pixels. Then, the stroke separation device 2204 calculates the black pixel joint elements of the binary image obtained by the line element restriction device and applies Otsu's binarization (see Reference 2: Technical Report of The Institute of Electronics, Information and Communication Engineers '80/4, Vol. J63-D, No. 4, p. 349–356, 1980) to a partial pattern in a gray scale image corresponding to each joint element. If an inter-class dispersion is a prescribed value or more or a dispersion ratio (intra-class dispersion/inter-class dispersion) is less than a prescribed value, the partial pattern is divided into two strokes.

Figure 23:
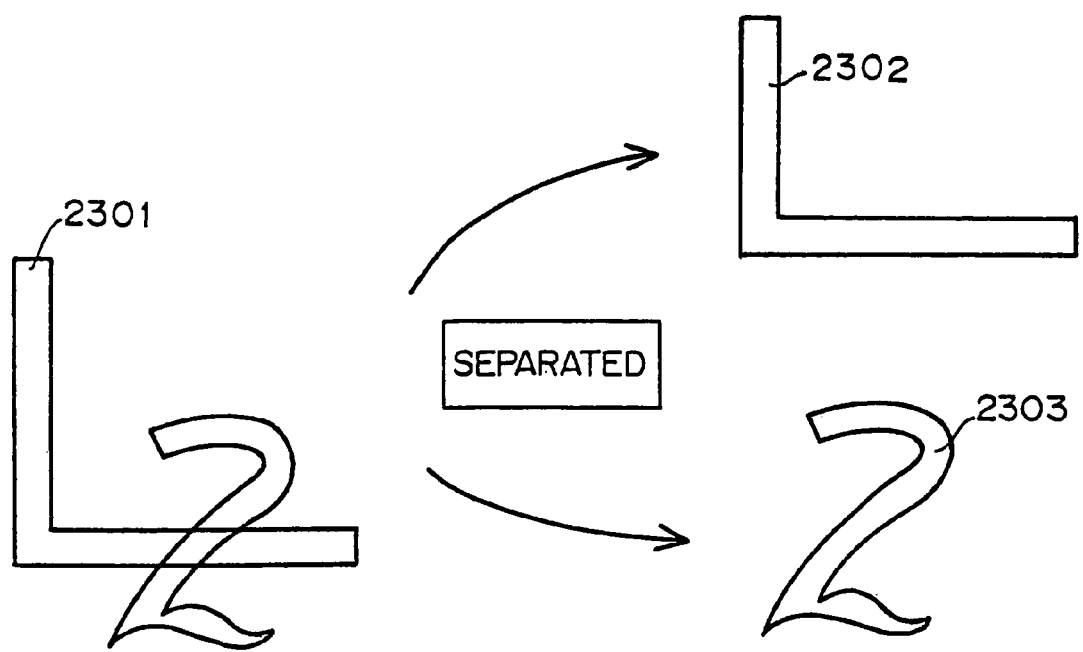
FIG. 23 shows the basic process of a stroke separation device.

FIG. 23 shows the concept of the process of the stroke separation device 2204. Otsu's binarization is applied to the partial pattern 2301 obtained by the line element restriction device 2203. Since the partial pattern 2301 is composed of two strokes of different gray levels (a character stroke 2303 and a ruled line stroke 2302), the inter-class dispersion becomes a fairly large value. If the calculated inter-class dispersion is a prescribed value or more, the partial pattern 2301 is divided into two strokes. If the partial pattern is composed of strokes of a small gray level difference, which is not shown in FIG. 23, the stroke separation device 2204 judges that they are the same kind of stroke and the pattern is not divided.

If the stroke separation device 2204 uses a dispersion ratio instead of the inter-class dispersion, it is configured to divide the partial pattern 2301 into two strokes when the dispersion ratio is less than a predetermined value.

Figure 24:
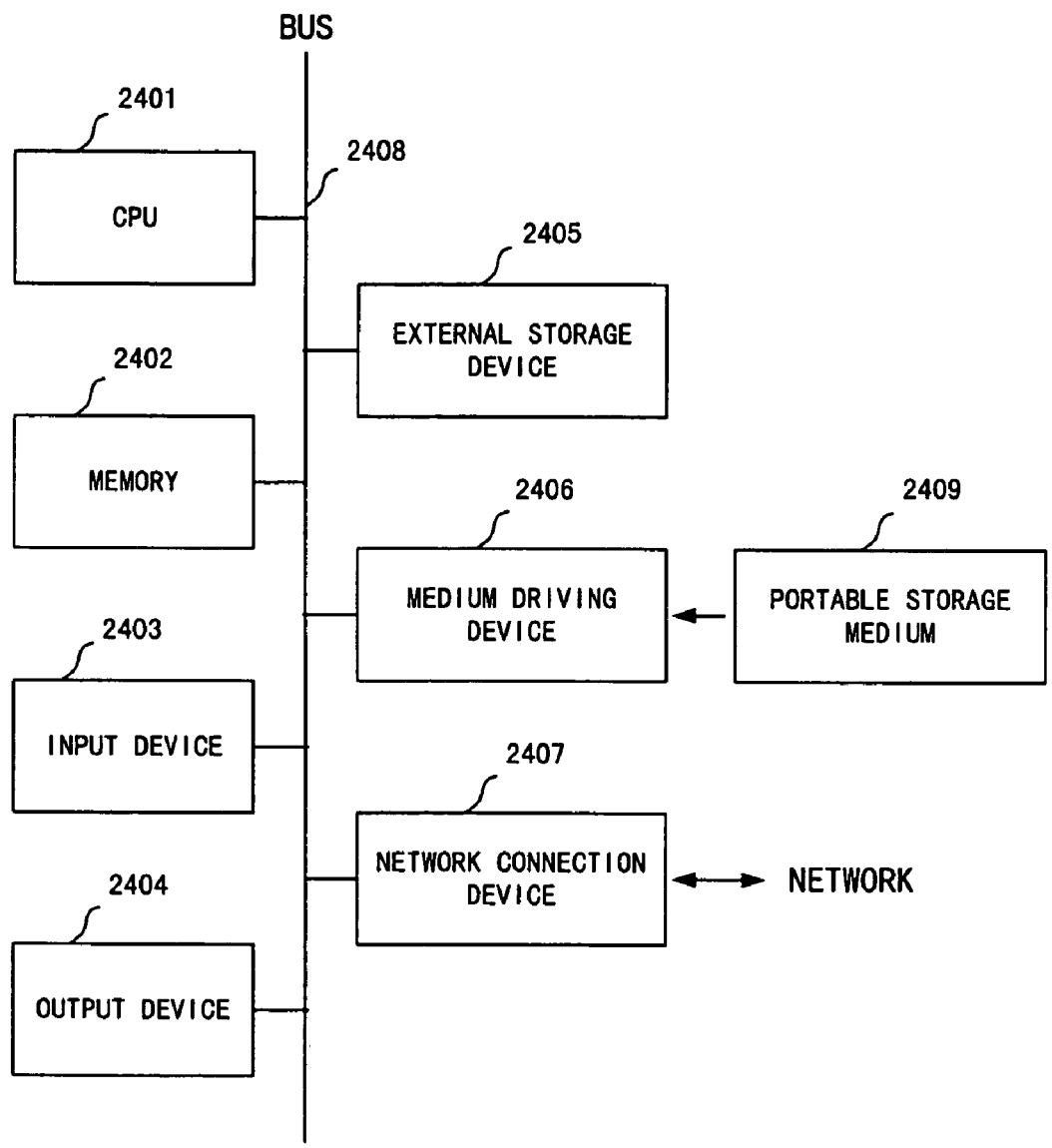
FIG. 24 shows an information processing device, which is used to configure the image processing apparatus of the present invention.

The image processing apparatuses described above can be configured using the information processing device (computer) shown in FIG. 24. The information processing device shown in FIG. 24 comprises a CPU (central processing device) 2401, a memory 2402, an input device 2403, an output device 2404, an external storage device 2405, a medium driving device 2406 and a network connection device 2407, and they are connected to one another by a bus 2408.

The memory 2402 includes, for example, a ROM (read-only memory), a RAM (random access memory), etc., and stores a program and data which are used for the process. The CPU 2401 executes necessary processes by using the memory 2402 and running the program. Specifically, the background judgment, local binarization, line element restriction and stroke separation described in each embodiment of the present invention are realized by the program stored in the memory 2402.

Image data, such as a slip, etc., are entered into the information processing device via the input device 2403, such as an OHR, etc. The output device 2404 includes, for example, a display, printer, etc., and is used to output process results, etc.

The external storage device 2405 includes, for example, a magnetic disk device, an optical disk device, a magneto-optical disk device, etc. The information processing device can store the program and data described above in this external storage device and can use the program and data by loading them into the memory 2402, if required.

The medium driving device 2406 drives the portable storage medium 2409. For the portable storage medium 2409, an arbitrary computer-readable storage medium, such as a memory card, a floppy disk, a CD-ROM (compact disk read-only memory), an optical disk, a magneto-optical disk, etc., is used. The program and data described above are stored in this portable storage medium 2409 and can be used by loading them into the memory 2402, if required.

The network connection device 2407 communicates with an external device via an arbitrary network (line), such as a LAN (local area network), etc., and performs a data conversion accompanying communications. The information processing device can receive the program and data described above from the external device via the network connection device 2407 and can use the program and data by loading them into the memory 2402, if required. Although FIG. 24 shows a single information processing device, the system can also be implemented by a processing device consisting of a plurality of computers or a plurality of processing devices via a network.

Figure 25:
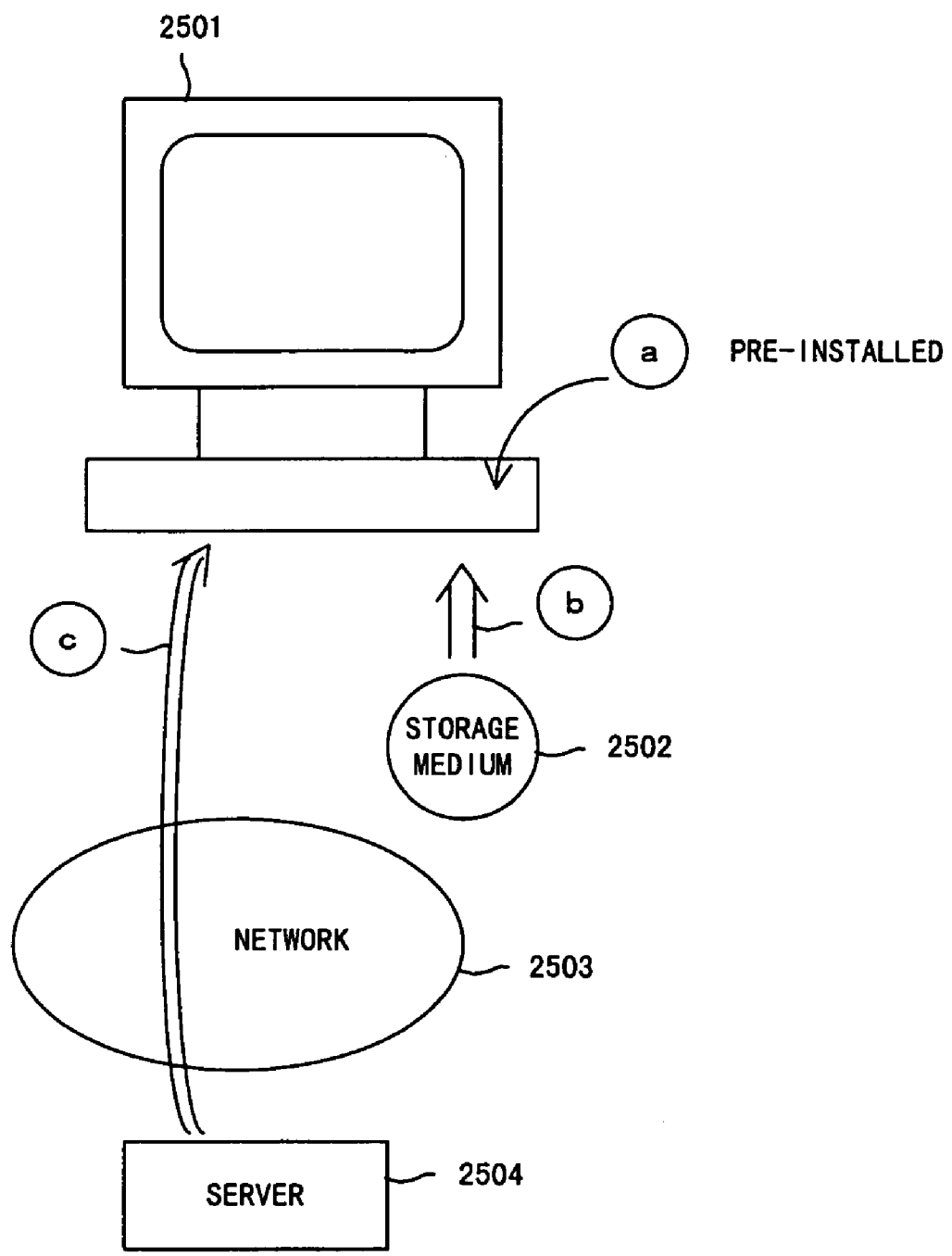
FIG. 25 shows how to provide the software program, etc., of the present invention.

FIG. 25 shows how to provide a software program, etc., to be run by the information processing device of the present invention. For example, such a program, etc., can be provided by one of the following three methods.

(a) Such a program, etc., is installed and provided in the information processing device, such as a computer, etc. In this case, such a program, etc., are, for example, pre-installed at a plant before shipment.

(b) Such a program, etc., is stored and provided in the portable storage medium 2502. In this case, the program, etc., stored in the portable storage medium 2502 is installed in the external storage device 2405 of the information processing device 2501, such as a computer, etc.

(c) Such a program, etc., is provided from a server in the network 2503. In this case, the information processing device 2501, such as a computer, etc., usually obtains the program, etc., by downloading the program etc., stored in the server 2504.

In this case, the server 2504 generates a signal for transmitting a program, etc., and transmits the signal to the information processing device 2501 via an arbitrary transmission medium in the network 2503.

In this way, according to the present invention, if image data, such as a slip, etc., which are obtained from an input device, such as an OHR, black-white flickering noises, which are conventionally generated in a background area, can be eliminated, and thereby high-accuracy binarization can be realized.

One aspect of the present invention comprises a background judgment device and a local binarization device. On receipt of a multilevel image, the background judgment device judges for each pixel whether the pixel is a background pixel. If it is judged that the pixel is not a background pixel, the local binarization device locally binarizes the pixel, judges whether the pixel belongs to a background or a stroke composing a character or ruled line and outputs a binary image. In this way, since the background judgment device roughly judges whether a target pixel is a background pixel, the occurrence of black-white flickering noises can be suppressed.

Another aspect of the present invention comprises a background judgment device, a local binarization device and a line element restriction device. On receipt of a multilevel image, the background judgment device judges for each pixel whether the pixel is a background pixel. If it is judged that the pixel is not a background pixel, the local binarization device locally binarizes the pixel, judges whether the pixel belongs to a background or a stroke and outputs a binary image. If the ratio of black pixels in the shape-fixed line element mask including a target pixel in the obtained binary image is a prescribed value or more, the line element restriction device leaves the black pixels as black pixels or converts all pixels in the line element mask into black pixels. In this way, the line element restriction device can eliminate noises short of a line element and the accuracy of background judgment can be improved.

Another aspect of the present invention comprises a background judgment device, a local binarization device, a line element restriction device and a stroke separation device. On receipt of a multilevel image, the background judgment device judges for each pixel whether the pixel is a background pixel. If the pixel is not a background pixel, the local binarization device performs a local binarization, judges whether the pixel belongs to a background or a stroke and outputs a binary image. If it is judged that the ratio of the black pixels in the shape-fixed line element mask including a target pixel in the obtained binary image is a prescribed value or more, the line element restriction device leaves the black pixels as black pixels or converts all pixels in the line element mask into black pixels. Then, the stroke separation device applies binarization to the partial pattern in a gray scale image corresponding to the black pixel joint element and divides the partial pattern into strokes of different gray levels. In this way, the stroke separation device can extract high-accuracy characters from a gray scale image in which a plurality of strokes, such as a ruled line, character, etc., touch.

What is claimed is:

1. An image processing apparatus, comprising:
    a background judgment device judging whether a target pixel is a background pixel using a gray level difference and a standard deviation of gray levels of pixels in a vicinity area of the target pixel on receipt of a multilevel image, wherein
    the gray level difference is an amount which is calculated based on a difference between an average gray level of white pixels in the vicinity area of the target pixel and an average gray level of black pixels in the vicinity area of the target pixel; and
    a local binarization device locally binarizing the target pixel and outputting a binary image if it is judged that the target pixel is not the background pixel.

2. The apparatus according to claim 1, wherein said local binarization device uses an amount which is calculated based on an average and a standard deviation of gray levels of pixels in the vicinity area of the target pixel as a binarization threshold for the target pixel.

3. The apparatus according to claim 2, wherein the amount which is calculated based on the average and the standard deviation of the gray levels of the pixels in the vicinity area of the target pixel is calculated based on a sum of the average and a constant-multiple of the standard deviation.

4. The apparatus according to claim 2, wherein the vicinity area of the target pixel is a rectangular area of N×N with a prescribed number of pixels N and the target pixel located at a center.

5. The apparatus according to claim 1, wherein said background judgment device judges whether the target pixel is the background pixel, using a standard deviation of gray levels of pixels in the vicinity area of the target pixel.

6. The apparatus according to claim 5, wherein said background judgment device judges whether the target pixel is the background pixel under a background judgment condition of $\sigma<\sigma_{min}$ with $\sigma$ as the standard deviation in the vicinity area of the target pixel and a min as a prescribed constant.

7. The apparatus according to claim 1, wherein said background judgment device judges whether the target pixel is the background pixel using a standard deviation of gray levels and a gray level difference of pixels in the vicinity area of the target pixel.

8. An image processing apparatus, comprising:
    a background judgment device judging for each target pixel whether the target pixel is a background pixel on receipt of a multilevel image, and
    a local binarization device locally binarizing the target pixel, judging which of a background and a stroke the target pixel belongs to, and outputting a binary image if it is judged that the target pixel is not the background pixel,
    wherein said background judgment device judges whether the target pixel is the background pixel using standard deviation of gray levels and a gray level difference of pixels in a vicinity area of the target pixel, and
    wherein said background judgment device judges whether the target pixel is the background pixel under a background judgment condition of $r=\sigma/\Delta g<r$ min with $\sigma$ as the standard deviation in the vicinity area of the target pixel, $\Delta g$ as the gray level difference in the vicinity of the target pixel and $r_{min}$ as a prescribed constant.

9. The apparatus according to claim 7, wherein said background judgment device judges whether the target pixel is the background pixel under a background judgment condition of $\Delta g<g_{min}$ with $\Delta g$ as the gray level difference in the vicinity of the target pixel and $\Delta g_{min}$ as a prescribed constant.

10. The apparatus according to claim 7, wherein the gray level difference is an amount which is calculated based on a difference between an average gray level of white pixels in the vicinity area of the target pixel and an average gray level of black pixels in the vicinity area of the target pixel.

11. An image processing apparatus, comprising:
    a background judgment device judging for each target pixel whether the target pixel is a background pixel on receipt of a multilevel image, and
    a local binarization device locally binarizing the target pixel, judging which of a background and a stroke the target pixel belongs to, and outputting a binary image if it is judged that the target pixel is not the background pixel, wherein said background judgment device judges whether the target pixel is the background pixel using standard deviation of gray levels and a gray level difference of pixels in a vicinity area of the target pixel, and
    wherein said background judgment device judges whether the target pixel is a background pixel using a combination of a background judgment conditions $\sigma<\sigma_{min}$, $r=\sigma/\Delta g<r_{min}$ and $\Delta g<\Delta g_{min}$ with $\sigma$ as the standard deviation in the vicinity area of the target pixel, $\Delta g$ as the gray level difference in the vicinity of the target pixel and $\sigma_{min}$, $r_{min}$ and $\Delta g_{min}$ as a prescribed constant.

12. The apparatus according to claim 1, further comprising:
    a line element restriction device executing a process of the obtained binary image based on a ratio of black pixels in a shape-fixed line element mask including the target pixel and outputting a binary image.

13. The apparatus according to claim 12, wherein
said line element restriction device leaves the black pixels in the line element mask as black pixels if the ratio of black pixels In the line element mask is a prescribed ratio or more.

14. The apparatus according to claim 12, wherein said line element restriction device converts all pixels in the line element mask Into black pixels if the ratio of black pixels in the line element mask is a prescribed ratio or more.

15. The apparatus according to claim 12, wherein
said line element restriction device converts all pixels in the line element mask into white pixels if the ratio of black pixels in the line element mask is less than a prescribed ratio.

16. The apparatus according to claim 12, wherein said line element restriction device uses a plurality of line element masks.

17. The apparatus according to claim 1, further comprising:
a stroke separation device applying a partial pattern in a gray scale image corresponding to a black pixel joint element in the obtained binary Image and separating strokes of different gray levels.

18. The apparatus according to claim 17, wherein said stroke separation device judges whether to perform a stroke separation using one of an inter-class dispersion and a dispersion ratio between different strokes.

19. The apparatus according to claim 1, wherein
said local binarization device judges which of the background and the stroke a pixel, which is judged to be the background pixel by said background judgment device, belongs to based on a gray level of the pixel.

20. An image processing apparatus, comprising:
judging for each target pixel whether a target pixel is a background pixel using a gray level difference and a standard deviation of gray levels of pixels in a vicinity area of the target pixel on receipt of a multilevel image, wherein
the gray level difference is an amount which is calculated based on a difference between an average gray level of white pixels in the vicinity area of the target pixel and an average gray level of black pixels in the vicinity area of the target pixel; and
locally binarizing the target pixel and outputting a binary image if it is judged that the target pixel is not the background pixel.

21. The method according to claim 20, further comprising: processing the obtained binary image based on a ratio of black pixels in a shape-fixed line element mask including the target pixel; and outputting a binary image.

22. The method according to claim 20, further comprising: binarizing a partial pattern in a gray scale image corresponding to a black pixel joint element in the obtained binary image; and separating strokes of different gray levels.

23. A computer-readable storage medium on which is recorded a program for enabling a computer extracting a stroke included in an inputted multilevel image to perform a process, said process comprising:
judging for each target pixel whether a target pixel is a background pixel using a gray level difference and a standard deviation of gray levels of pixels in a vicinity area of the target pixel on receipt of a multilevel image, wherein
the gray level difference is an amount which is calculated based on a difference between an average gray level of white pixels in the vicinity area of the target pixel and an average gray level of black pixels in the vicinity area of the target pixel; and
locally binarizing the target pixel and outputting a binary image if it is judged that the target pixel is not the background pixel.

24. The storage medium according to claim 23, said process further comprising:
processing the obtained binary image based on a ratio of black pixels in a shape-fixed line element mask including the target pixel; and outputting a binary image.

25. The storage medium according to claim 23, said process further comprising:
binarizing a partial pattern in a gray scale image corresponding to a black pixel Joint element in the obtained binary image; and separating strokes of different gray levels.

26. An image processing apparatus, comprising:
input means for receiving a multilevel image; and
background judgment means for judging whether a target pixel is a background pixel using a gray level difference and a standard deviation of gray levels of pixels in a vicinity area of the target pixel; wherein
the gray level difference is an amount which is calculated based on a difference between an average gray level of white pixels in the vicinity area of the target pixel and an average gray level of black pixels in the vicinity area of the target pixel; and
local binarizatiod means for locally binarizing the target pixel and outputting a binary image if it is judqed that the target pixel is not the background pixel.

27. A transmission signal transmitting to a computer, which extracts a stroke included in an inputted multilevel image, a program for enabling the computer to perform a process, said process comprising:
judging for each target pixel whether a target pixel is a background pixel using a gray level difference and a standard deviation of gray levels of pixels in a vicinity area of the target pixel on receipt of a multilevel image, wherein
the gray level difference is an amount which is calculated based on a difference between an average gray level of white pixels in the vicinity area of the target pixel and an average gray level of black pixels in the vicinity area of the target pixel; and
locally binarizing the target pixel and outputting a binary image if it is judged that the target pixel is not the background pixel.

28. An image processing method, comprising:
receiving a multilevel image;
measuring an average gray level of white pixels in the vicinity area of the target pixel of the multilevel image;
measuring an average gray level of black pixels in the vicinity area of the target pixel;
calculating a gray level difference based on a difference between the average gray level of white pixels and the average gray level of black pixels in the vicinity area of the target pixel; and
judging whether the target pixel is a background pixel using the gray level difference and a standard deviation of gray levels of pixels in the vicinity area of the target pixel.

* * * * *

UNITED STATES PATENT AND TRADEMARK OFFICE
CERTIFICATE OF CORRECTION

PATENT NO. : 7,167,281 B1
APPLICATION NO. : 09/669663
DATED : January 23, 2007
INVENTOR(S) : Katsuhito Fujimoto et al.

It is certified that error appears in the above-identified patent and that said Letters Patent is hereby corrected as shown below:

Column 12, Line 5, change "a min" to --$\sigma_{min}$--.

Column 12, Line 22, after "using" insert --a--.

Column 12, Line 27, change "r=σ/Δg<r min" to --r= $\sigma/\Delta g < r_{min}$--.

Column 12 , Line 51, after "using" insert --a- --.

Column 12, Line 53, change "a" to --the--.

Column 13, Line 4, change "In" to --in--.

Column 13, Line 8, change "Into" to --into--.

Column 13, Line 22, change "Image" to --image--.

Column 14, Line 15, change "Joint" to --joint--.

Column 14, Line 29, change "binarizatiod" to --binarization--.

Column 14, Line 30, change "judqed" to --judged--.

Signed and Sealed this

Twenty-fourth Day of April, 2007

JON W. DUDAS
*Director of the United States Patent and Trademark Office*